United States Patent
Smith et al.

(10) Patent No.: US 6,219,409 B1
(45) Date of Patent: Apr. 17, 2001

(54) PREMISES GATEWAY AND PREMISES NETWORK INTERFACES FOR ACCESSING SUBSCRIBER PREMISES EQUIPMENT AND COMMUNICATION NETWORKS USING RING SUPPRESSION

(75) Inventors: Todd Smith; Michael Pelster; Benjamin Isaac; Debashis Bagchi, all of Reno, NV (US)

(73) Assignee: ShareGate, Inc., Reno, NV (US)

( * ) Notice: Subject to any disclaimer, the term of this patent is extended or adjusted under 35 U.S.C. 154(b) by 0 days.

(21) Appl. No.: 09/137,074

(22) Filed: Aug. 20, 1998

Related U.S. Application Data

(63) Continuation-in-part of application No. 09/031,535, filed on Feb. 27, 1998.

(51) Int. Cl.[7] ............................. H04M 11/00; H04M 1/00

(52) U.S. Cl. ............................. 379/106.09; 379/106.03; 379/156

(58) Field of Search ................. 379/88.17, 93.05–93.07, 379/93.11, 93.34, 102.01, 106.03, 106.05–106.09, 133, 142, 156–157, 166; 370/229–230, 235–236, 254–258, 360, 362–368, 386–388, 401–405, 410, 422–426

(56) References Cited

U.S. PATENT DOCUMENTS

| | | | |
|---|---|---|---|
| 4,086,434 | 4/1978 | Bocchi ................................ 179/2 |
| 4,394,540 | 7/1983 | Willis et al. ......................... 179/2 |
| 4,847,892 | 7/1989 | Shelley ............................... 379/92 |
| 5,086,385 | 2/1992 | Launey et al. .................... 364/188 |
| 5,109,222 | 4/1992 | Welty ............................ 340/825.72 |
| 5,189,694 | 2/1993 | Garland ............................. 379/106 |
| 5,206,900 | 4/1993 | Callele ............................. 379/142 |
| 5,239,575 | 8/1993 | White et al. ..................... 379/107 |
| 5,267,307 | 11/1993 | Izumi et al. ..................... 379/354 |
| 5,301,303 | 4/1994 | Abraham et al. ................. 395/500 |
| 5,305,312 | 4/1994 | Fornek et al. ...................... 370/62 |
| 5,351,289 | 9/1994 | Logsdon et al. ................. 379/142 |
| 5,359,641 | 10/1994 | Schull et al. ..................... 379/106 |
| 5,361,296 | 11/1994 | Reyes et al. ....................... 379/96 |
| 5,394,461 | * 2/1995 | Garland ....................... 379/106.09 |
| 5,396,548 | 3/1995 | Bayerl et al. .................... 379/140 |
| 5,467,385 | 11/1995 | Reuben et al. .................... 379/88 |
| 5,479,493 | 12/1995 | Baker et al. ..................... 379/127 |
| 5,550,913 | 8/1996 | McMaster et al. ............... 379/230 |
| 5,559,860 | 9/1996 | Mizikovsky ........................ 379/58 |

(List continued on next page.)

OTHER PUBLICATIONS

"About eT Communications", "eT Communications Customers," and "eT Communications Products"; www.etcom.com; May 18, 1998.

"The Residential Gateway"©1995 Bellcore, B&C Consulting, David Sarnoff Research Center, GTE, Hewlett Packard, IBM, Reliance Comm Tec. pp.1–24.

Primary Examiner—Curtis Kuntz
Assistant Examiner—George Eng
(74) Attorney, Agent, or Firm—Roylance, Abrams, Berdo & Goodman

(57) ABSTRACT

A premises gateway is provided with respect to a subscriber's premises and a plurality of different transmission media for connecting to network devices and host systems on a network. The premises gateway has interchangeable network interface cards and cards for communicating with different nodes on a subscriber's premises using different transmission media and protocols. The nodes are provided with premises network interfaces which operate in conjunction with the premises gateway to allow, for example, devices connected to the same telephone line, but to different telephone wall jacks, to be addressed separately. The premises gateway can communicate analog signals and broadband signals on a twisted pair to the same node. The premises gateway can also be provided at a central office to operate as an Internet protocol gateway.

10 Claims, 22 Drawing Sheets

U.S. PATENT DOCUMENTS

| | | | |
|---|---|---|---|
| 5,563,938 | 10/1996 | Soshea et al. | 379/201 |
| 5,563,939 | 10/1996 | La Porta et al. | 379/220 |
| 5,581,599 | 12/1996 | Tsuji et al. | 379/63 |
| 5,610,910 * | 3/1997 | Focsaneanu et al. | 370/401 |
| 5,621,727 | 4/1997 | Vaudreuil | 370/60 |
| 5,636,211 | 6/1997 | Newlin et al. | 370/468 |
| 5,642,101 | 6/1997 | Stirk et al. | 340/825.08 |
| 5,699,276 | 12/1997 | Roos | 364/514 A |
| 5,737,400 | 4/1998 | Bagchi et al. | 375/142 |
| 5,815,086 | 9/1998 | Ivie et al. | 340/825.52 |
| 5,838,226 | 11/1998 | Houggy et al. | 340/310.01 |
| 5,875,430 | 2/1999 | Koether | 705/1 |
| 5,880,677 | 3/1999 | Lestician | 340/825.06 |
| 5,886,647 | 3/1999 | Badger et al. | 340/825.69 |
| 5,886,732 | 3/1999 | Humpleman | 348/10 |
| 5,892,758 | 4/1999 | Argyroudis | 370/335 |

\* cited by examiner

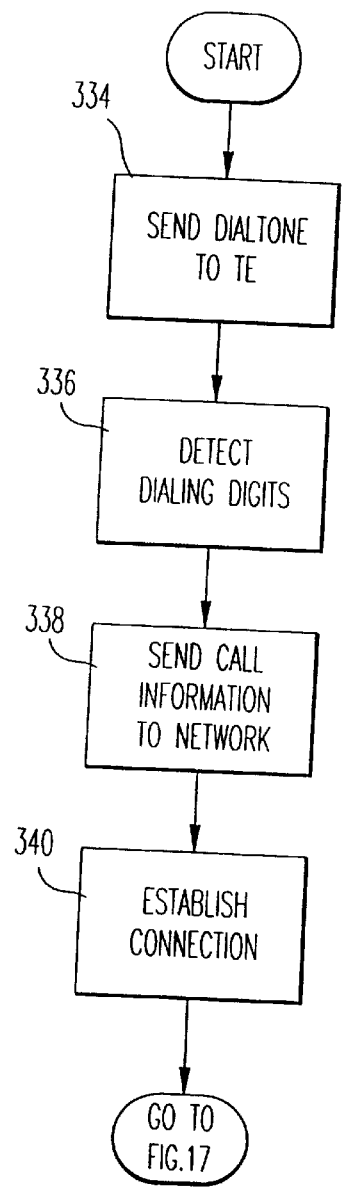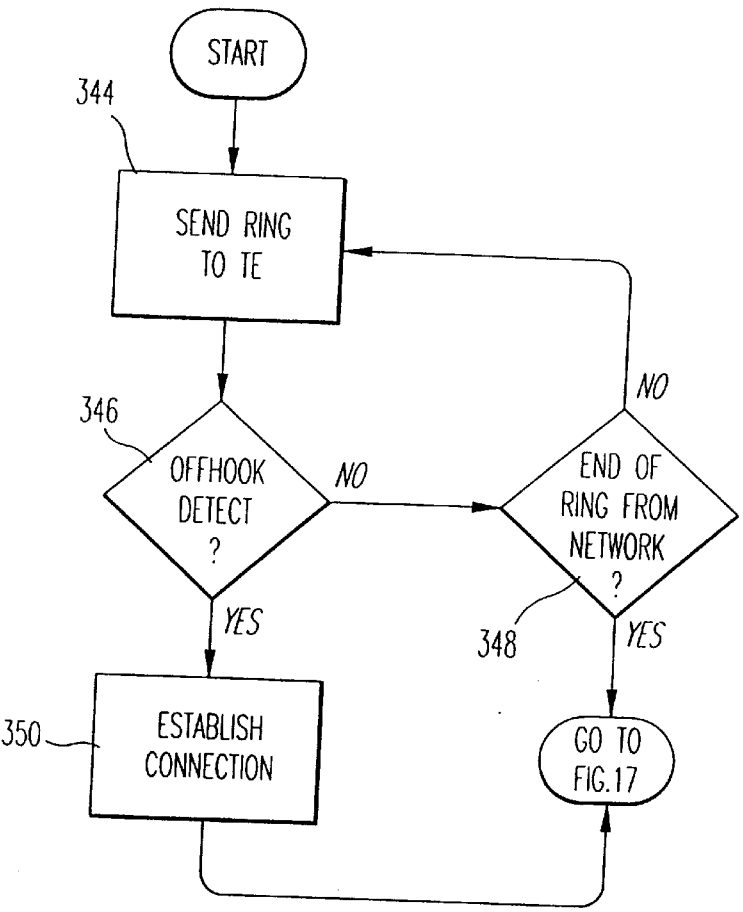
FIG. 23
FIG. 24

PREMISES GATEWAY AND PREMISES NETWORK INTERFACES FOR ACCESSING SUBSCRIBER PREMISES EQUIPMENT AND COMMUNICATION NETWORKS USING RING SUPPRESSION

This application is a continuation-in-part application of Ser. No. 09/031,535, filed Feb. 27, 1998. Related subject matter is disclosed and claimed in U.S. Pat. No. 5,737,400, the entire subject matter of which is hereby incorporated herein by reference for all purposes.

FIELD OF THE INVENTION

The invention relates to a no-ring access system operating as a gateway for selectively connecting host systems and networks with subscriber premises equipment for voice and data communication applications. The no-ring access gateway can be provided at the demarcation point between the subscriber premises and central office or at the central office.

BACKGROUND OF THE INVENTION

A number of systems are available for utility companies to obtain data from utility meters at subscriber locations without having to send service personnel to the subscriber location to read and record meter information. For example, U.S. Pat. No. 5,359,641, to Schull et al, discloses a telemetry system for accessing equipment at subscriber locations through a switching network. Control equipment in the telemetry system is configured to identify the signaling modes for loop networks connected to the subscriber locations. The signaling mode (e.g., a no signaling mode or an identified signaling mode of specified duration) for each subscriber location is stored with other customer information, as well as a reference identification number associated with equipment at the subscriber location. The control system comprises trunks which indicate to the central office switch that connections being requested by the control system are to be made with ringing suppression. The system disclosed in the Schull et al patent is therefore disadvantageous because it requires modification of the central office switch in order to communicate with the control system, among other reasons. Most telephone companies are not willing to modify a digital switch in order to provide only one new service such as telemetry.

A number of systems have been developed to report conditions such as power usage meter levels by initiating a telephone call to a utility company from a subscriber location. See, for example, U.S. Pat. No. 4,086,434, to Bocchi, U.S. Pat. No. 4,487,892, to Shelley, U.S. Pat. No. 5,239,575, to White et al, and U.S. Pat. No. 4,394,540, to Willis et al. These systems are programmed to initiate a telephone call to a host computer of a utility company, for example. The telemetry reporting is typically conducted by initiating telephone calls to the host computer at predetermined intervals, such as once a month. Alternatively, equipment at a subscriber location can monitor a telephone line for a polling signal from a host computer. Following detection of the polling signal, the equipment calls the host computer to transfer utility meter readings. These systems are disadvantageous for a number of reasons. For example, they can interfere with the establishment of voice calls to a telephone connected to the telephone line at the subscriber location. Further, they do not guarantee that a utility company or other service provider will be called by the subscriber, that is, the subscriber's telephone line may be out of order or disconnected or the subscriber device for connecting to a remote system may have failed. It is disadvantageous to require utility companies to passively monitor whether or not a subscriber has called and to ascertain reasons (e.g., system failure) for his or her failure to do so. It is more advantageous to centralize the functions of utility and other service providers to actively monitor a subscriber's usage of a utility or other service such as an on-line information service by initiating the telephone connection to the subscriber.

Other systems have been provided which allow equipment at the subscriber location to interrogate incoming calls using data identifing a calling party in order to determine whether or not to answer the incoming telephone call. For example, U.S. Pat. No. 5,351,289, to Logsdon et al, discloses apparatus for receiving and demodulating caller identification signals, which are provided by a telephone company during the silent interval between the first and second power ring signals of an incoming call, to control an electronic switching device. The apparatus is configured to maintain the switching device in a non-conductive state while caller identification data (i.e., CallerID) is received and analyzed to determine whether or not to suppress subsequent power ring signals. If the telephone call is being initiated by a selected calling party, the apparatus is programmed to operate the switching device in a conductive state and allow the incoming telephone call to pass to a telecommunications device connected to the apparatus. The apparatus is connected between a central office and a telecommunications device and comprises a single terminal adapter for connection to the telecommunications device (e.g., a facsimile machine, a modem, an answering machine or a standard telephone set). The apparatus is disadvantageous because it interferes with establishing voice calls. The apparatus only monitors the connection of the telecommunications device to the apparatus, and not to the telephone line itself to determine whether a handset has gone off-hook. Further, once CallerID is used to determine whether or not to close the switching device and connect an incoming call to the telecommunications device, the CallerID is no longer available for the telecommunications device to identify the calling party. In addition, the apparatus cannot be used with more than one telecommunications device without providing another telephone line.

U.S. Pat. No. 5,206,900, to Callele, discloses an apparatus for interfacing a telephone to a telephone network and for receiving caller identification information from incoming telephone calls. The apparatus can acknowledge receipt of the caller identification information to the incoming calling party, can cause the incoming call to be answered or not answered, and can forward the caller identification information to a subscriber at a predetermined location. However, the apparatus disclosed in then Callele patent does not provide for the connection of the calling party to the called party. Instead, the apparatus operates as an automated attendant for forwarding information to the called party so that he or she can return the call at a later time if desired.

U.S. Pat. No. 5,267,307, to Izumi et al, and U.S. Pat. No. 5,396,548, to Bayerl et al, also disclose systems which receive and analyze information identifying a calling party. These systems, however, do not operate to provide a subscriber, who has a single non-dedicated telephone line, with information regarding the identification of the calling party following ring suppression. In contrast, the Izumi et al patent uses the information regarding the calling party to determine how to ring extension terminal equipment in a private branch exchange or a key telephone system. The Bayerl et al patent uses calling party identification during a silent interval between ring signals on an incoming call to determine which of a number of stations connected to a central office or PBX the incoming call should be directed to. The system is programmed to transmit the caller identification information between successive ring signals for receipt by other stations.

SUMMARY OF THE INVENTION

In accordance with the present invention, a telecommunications system is provided which overcomes a number of disadvantages associated with existing telecommunications systems providing telemetry and caller identification services, and realizes a number of advantages. The telecommunications system can be connected to a non-dedicated telephone line at a subscriber location and allows no-ring access to one or more telecommunications devices connected to the non-dedicated line. The telecommunications system can provide telemetry and other applications without interfering with the establishment of regular voice calls.

In accordance with another aspect of the present invention, the telecommunications system operates as a premises gateway or hub with respect to coaxial cable, fiber optic, twisted pair, and hybrid fiber optic/coaxial cable connections to a subscriber's premises and a wide area network, and as a local area network with respect to a plurality of telecommunications devices at the subscriber's premises. Communications devices can also be provided at the subscriber's premises which are radiofrequency-controlled.

In accordance with an aspect of the present invention, the premises gateway is configured to communicate with host systems via a network using different transmission media and protocols such as twisted pair, a coaxial cable, radiofrequency signaling, a fiber optic link and a hybrid fiber optic/coaxial cable link. Further, the premises gateway is configured to communicate with devices at the subscriber's premises using different transmission media and protocols. The premises gateway is provided with interchangeable network interface cards for handling signaling to and from the network using different transmission media and protocols. Likewise, the premises gateway is provided with interchangeable cards for communicating with various nodes at a subscriber's premises using different transmission media and protocols. The premises gateway comprises a central processing unit (CPU) board for communicating with the network interface cards and the node interface cards and for routing signals received therefrom to another network interface card or node interface card.

In accordance with another aspect of the present invention, the premises gateway is configured to address nodes at a subscriber's premises to which device(s) are connected on an individual basis. Each node is provided with a premises network interface (PNI) recognized and individually addressed by the CPU board. The CPU board accesses a memory device to determine to which node a signal is to be sent based on information transmitted with the signal to identify the called device. Thus, devices connected in parallel to the same telephone line servicing a subscriber's premises, but located at different telephone wall jacks, can be addressed separately by the CPU board if each of the devices is provided with its own PNI.

In accordance with another aspect of the present invention, each network interface card and each PNI is provided with a switch to suppress signaling to a device at the subscriber's premises until commanded by the CPU board.

In accordance with yet another aspect of the present invention, the premises gateway is configured to accommodate both narrow band and broadband communications on twisted pair media between host systems and devices at a subscriber's premises. Different multiplexing methods can be employed to transmit digital data on dynamically assignable subchannels, along with a voice call on the same twisted pair.

In accordance with still another aspect of the present invention, the premises gateway can be implemented with no modification of a central office switch, yet allows utility companies and other service providers to initiate telephone calls to devices at the subscriber's premises.

In accordance with still yet another aspect of the present invention, the premises gateway can be operable to analyze caller identification information, distinctive ringing, and other special central office signals (e.g., an AT&T 600 millisecond (ms) signal) to determine whether or not an incoming call is a data call intended for a data communications device at the subscriber's premises, or a regular voice call intended for a subscriber handset.

In accordance with another aspect of the present invention, the premises gateway is provided at a central office and operable as an Internet Protocol gateway to allow connections between subscriber premises equipment and the public switched telephone network or particular data networks for Internet access.

BRIEF DESCRIPTION OF THE DRAWINGS

These and other features and advantages of the present invention will be more readily apprehended from the following detailed description when read in connection with the appended drawings, which form a part of the original disclosure, and wherein:

FIGS. 17–24 are flow charts illustrating a sequence of operations of a premises network interface constructed in accordance with an embodiment of the present invention.

DETAILED DESCRIPTION OF THE PREFERRED EMBODIMENTS

Figure 1:
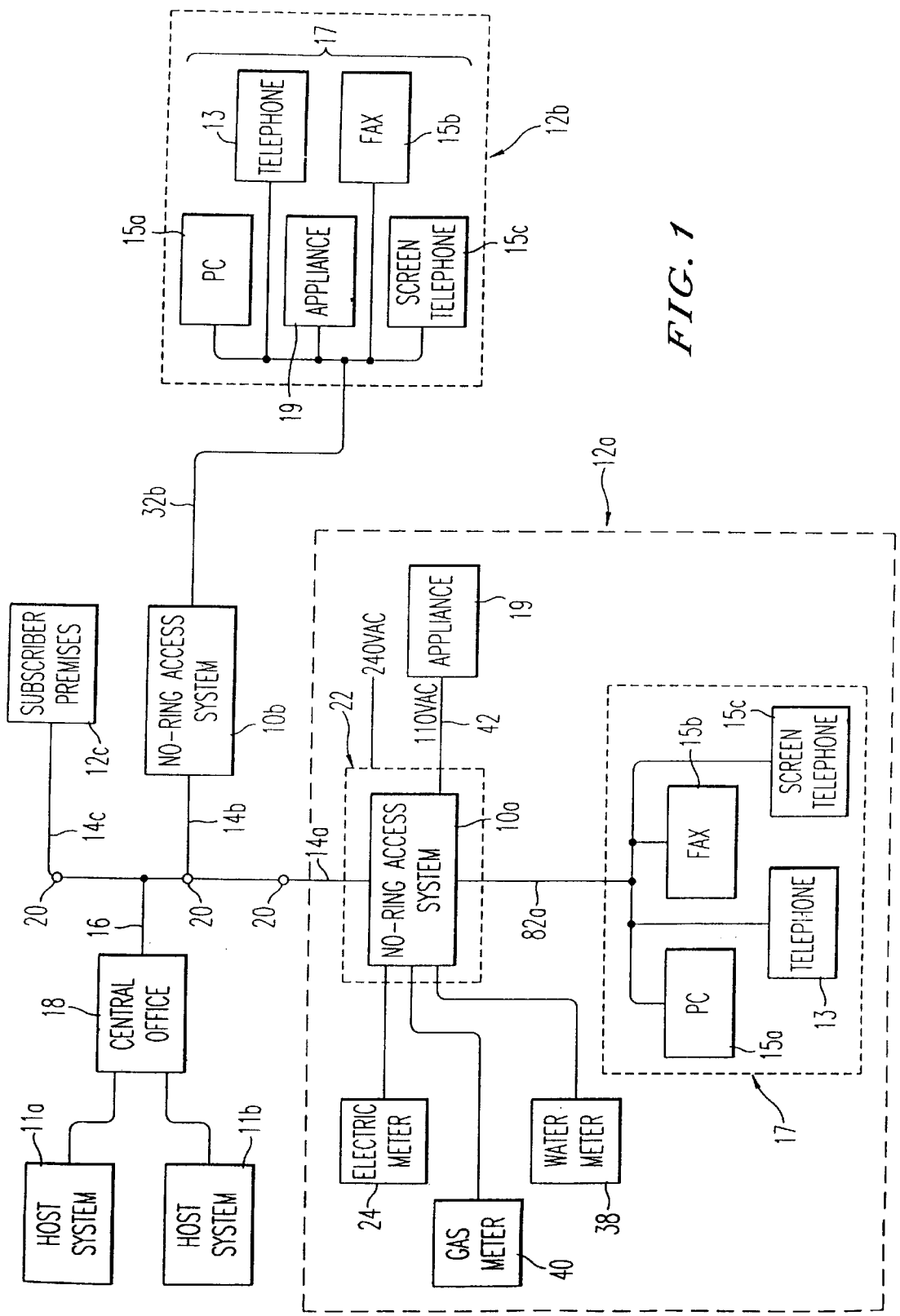
FIG. 1 is a schematic block diagram of two telecommunications systems, each constructed in accordance with an embodiment of the present invention and which are shown, respectively, connected inside the a subscriber's premises, and at the demarcation point between a telecommunications network and a subscriber's premises.

FIG. 1 illustrates two telecommunications systems 10a and 10b for providing remote data communications systems 11a and 11b with no-ring access to telecommunication devices at subscribers' premises 12a and 12b via the public switched telephone network (PSTN) for various applications such as screen telephony, downloading of ADSI/UTS script, script management, PC telephony, display-based marketing, automated meter reading, appliance control, among other applications. Thus, the systems 10a and 10b can be used by subscribers to communicate with, for example, gas, water and electric utility companies, on-line information service providers, banks and stock brokerage firms, security companies, medical and fire emergency bureaus, home shopping vendors, among other service providers. In addition to providing utility companies with meter readings via the PSTN, the systems 10a and 10b can be used to remotely control appliances 19 at the subscriber's premises 12.

Each telecommunications system 10 is preferably connected in series to a non-dedicated telephone line 14a, 14b or 14c servicing a building or other facility on the subscriber's premises 12a, 12b or 12c, respectively, which houses a telephone 13 and any other data communication equipment 15a, 15b and 15c. The telephone 13 and the data communication equipment 15 shall hereinafter be collectively referred to as customer premises equipment (CPE) 17. The telecommunications system 10 is preferably the first device on the telephone line servicing the subscribers' premises 12. The telecommunications system 10 is configured to operate using two-way communication, and can initiate telephone calls to a utility company or information provider's host system 11 or connect with a telephone call established by a utility company or information provider 11 via on-hook signaling.

With continued reference to FIG. 1, a number of subscriber premises 12a, 12b and 12c are shown which are connected via their respective telephone lines 14a, 14b and 14c to the telecommunications network 16 and the central office 18. In accordance with one embodiment of the present invention, the no-ring access system 10 is provided inside a building or other facility, as illustrated, for example, at subscriber location 12a. In accordance with another embodiment of the present invention, the no-ring access system 10 is provided at the demarcation point 20 between the network 16 and the telephone line 14b of subscriber location 12b. In accordance with a third embodiment of the present invention, the no-ring access system 10 is provided at the central office 18 of the telephone company, as described in more detail below.

When the system 10 is provided at the subscribers' utility meter site, as shown in subscriber location 12a in FIG. 1, the system 10 can reside in an adapter 22 between a utility meter 24 and a power outlet socket 26 in the wall of the subscriber facility. As will be described in more detail below, the system 10 is provided with a connector 28 for connecting to the telephone line 14a and another connector 30 for connecting to a telephone line 32 provided within the subscribers' facility. For illustrative purposes, the utility meter 24 can be a conventional electric meter having a pulse initiator and three terminals for connecting the meter to a device (e.g., an optocoupler) which counts the number of revolutions of a rotating disc within the meter. As stated previously, the system 10 can provide the number of revolutions to a utility company via the PSTN. The meter 24 can be the a meter available from, for example, General Electric Company of Somersworth, N.H., or from Westinghouse Electric Corporation of Pittsburgh, Pa. (e.g., a Westinghouse meter Model S.510C961G29). The adapter can be a Model 37 Series adapter or a 4000–160 Series or 5000 Series adapter available from Ekstrom Industries Incorporated of Farmington Hills, Mich. This system can be powered by a 240 volt AC line entering the subscribers' premises 12a. The 240 volt AC line is tapped from inside the adapter 22 by making contact between two of the four sleeves (not shown) inside the adapter 22. The system 10 is provided with a power supply 58 (FIG. 2) which comprises surge protectors and noise filter circuits. The system 10 can communicate over a power line 42 using CE-Bus protocol. The system 10 can also be used to communicate with gas and water meters 38 and 40, respectively, through the telephone line or using radio frequency communication, for example.

With regard to subscriber premises 12b in FIG. 1, a system 10 installed at the demarcation point 20 can be powered by the telephone line 14 or 32 or by the external 110 VAC power line 42. For example, the system 10 can receive power from a battery at the central office 18 via the line 14. An adapter 22 can be connected to the 110 VAC power line and provide power to the system 10 via the line 32. In addition, a separate 12 volt adapter (not shown) can be connected to the 110 VAC power line and the system 10.

The system 10 installed at the utility meter site of subscriber premises 12a can participate in meter reading and other utility-related functions, as well as operate as a gateway device to provide no-ring access to the subscribers' premises 12a for information service providers via the interior phone line 32. The system 10 at the demarcation point 20 of subscriber premises 12b can operate as a gateway device for information providers without the utility functions being enabled. Similarly, a system 10 installed at the central office in accordance with a third embodiment provides no-ring access to, for example, residential houses and establishes a communication path between information provider host servers and utility host servers with the subscribers.

The systems 10 will now be described in further detail with reference to FIG. 2. Each system 10 comprises a line interface circuit 44 and a ring cadence circuit 46 which operate in conjunction with the microprocessor 48 to answer an incoming telephone call on telephone line 14. The ring cadence circuit 46 can be a conventional circuit. The line interface circuit 44 can also be a conventional circuit comprising isolation transformers and other devices, as well as logic circuitry, for detecting incoming signals on the line 14 and for generating an interrupt to the microprocessor 48. The microprocessor 48 is programmed to suppress the first power ring signal detected by the line interface circuit 44 from being delivered to the telephone line 32 by maintaining a normally open switch 50, which is operated under microprocessor control using a relay 52, in the open position. The relay 52 can be an electronic or electromagnetic relay, for example.

As will be described in further detail below, the microprocessor 48 is programmed to analyze caller identification information (e.g., CallerID provided by the telephone company between the first and second ring signals of an incoming call) to determine whether the incoming call is intended for a data communications device 15 such as a personal computer (PC) or for a telephone 13 connected to the line 32. While different types of caller identification information can be used by the host system 11 and/or the central office 18 and analyzed by the system 10, analysis of CallerID by the system 10 will hereinafter be described for illustrative purposes.

Figure 2:
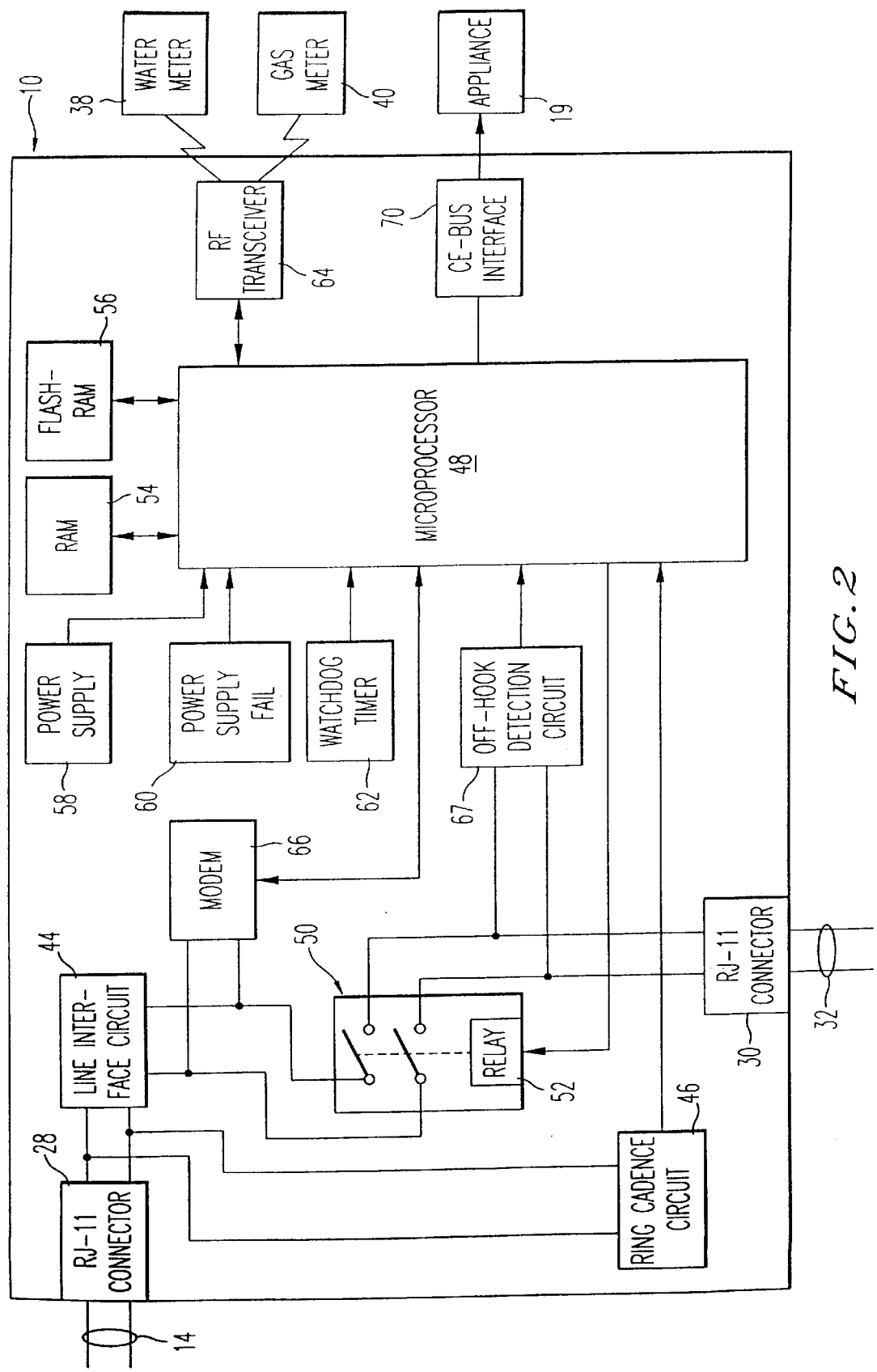
FIG. 2 is a schematic block diagram of a no-ring access telecommunications system constructed in accordance with an embodiment of the present invention.
Figure 3:
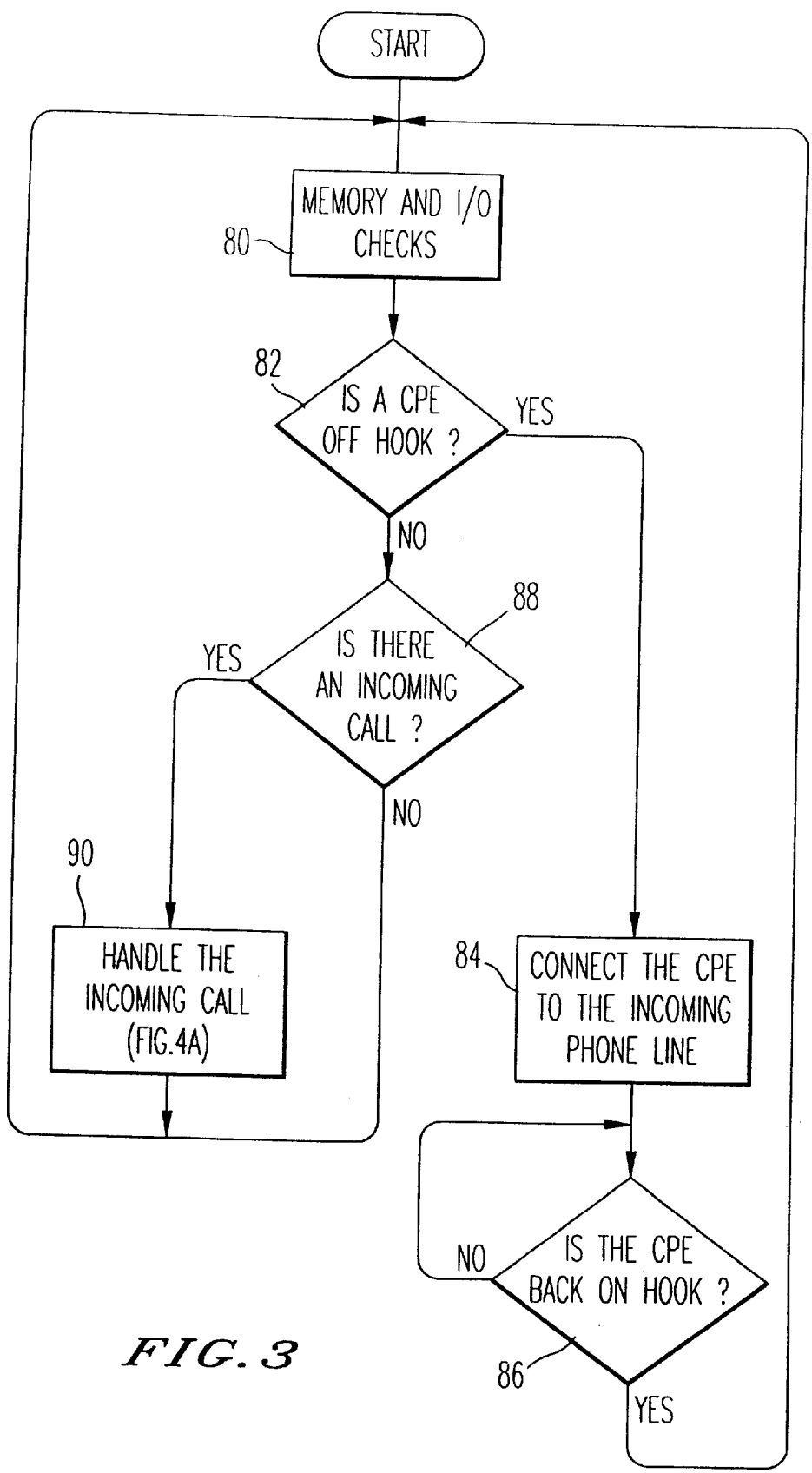
FIGS. 3, 4A, 4B, 5, 6, and 7 are flow charts depicting a sequence of operations for establishing a telephone connection between a remote data communications system and at least one telecommunications device located at a subscriber's premises using a no-ring access telecommunications system in accordance with an embodiment of the present invention.

With reference to FIG. 2, an incoming call from the central office 18 on line 14 is forwarded to the telephone 13 and data communications devices on line 32 by closing the switch 50 via the relay 52. The microprocessor 48 is also programmed to distinguish calls from utility and information service provider host systems 11 from voice calls using distinctive ring pattern detection or detection of a special signal such as the 600 millisecond CPE alert signal (CAS) provided by the telephone company central office. If an incoming call from a utility or information provider server is detected, the system 10 answers the call using the line interface circuit 44 and the microprocessor 48. The microprocessor 48 performs an identification and authentication process with the utility or information service provider host system 11 as described in connection with FIGS. 4A and 4B. This process is transparent to the telephone 13 at the subscribers' facility. While the system 10 is on-line with the host system 11, the system 10 can monitor the subscribers' telephone 13. The system 10 preferably disconnects from the host system when the telephone 13 goes off-hook in order to provide the telephone 13 with a central office dial tone and establish a voice call. The system 10, however, can be configured to give a data call priority over an outgoing voice call.

With continued reference to FIG. 2, the microprocessor 48 is programmed to monitor essentially all activities in the system 10. It is provided with digital memory consisting of both a static random access memory (RAM) 54 and a flash memory 56. The RAM is preferably used for data storage. The flash memory 56 is preferably used for storing program code. The flash memory 56 facilitates the downloading of a new program over a telephone line 12, among other functions. A power supply 58 is connected to the microprocessor 48, as well as a power supply fail circuit 60 and a watchdog timer 62. An RF transceiver 64 is connected to the microprocessor for communicating with the water and gas meters 38 and 40 using a communication link such as a radio frequency link. In addition to a radio frequency link, utility companies can communicate with meters and other equipment in the system 10 via other communication channels such as coaxial cable, copper wires, optical fiber, or the like. A modem 66 is connected to the microprocessor 48 for sending data such as utility meter readings to a host system 11 via the line interface circuit 44 and the telephone line 14. An off-hook detection circuit 67 is connected to the microprocessor 48 and the interior telephone line 32 to determine when a telephone 13 goes off-hook. As stated previously, the microprocessor can be programmed to interrupt a data call to the system 10 to allow a subscriber to establish a voice call via the telephone 13 or other telecommunications device. The lines 14 and 32 need not be copper wires. They can be essentially any telecommunications medium such as ISDN lines, optical fiber, and the like. The microprocessor 48 can be programmed to process calls requiring different amounts of bandwidth.

The operation of the system 10 will now be described with reference to the flow charts in FIGS. 3, 4A, 4B, 5, 6, and 7. With reference to block 80 in FIG. 3, the microprocessor 48 is programmed to perform memory input and output (I/O) status tests following power up and initialization of the system 10. The microprocessor 48 determines whether the telephone 13 within the subscribers' facility has gone off-hook using the off-hook detection circuit 67, as indicated by the affirmative branch of decision block 82. The microprocessor proceeds to connect the telephone 13 or other CPE 17 to the telephone line 14 by closing the switch 50 using the relay 52 (block 84). Once that particular piece of CPE 17 has returned to an on-hook condition, as indicated by the affirmative branch of block 86, the microprocessor 48 continues to monitor whether any CPE has gone off-hook (block 82) or for the presence of an incoming call on telephone line 14 (block 88). With reference to block 90, the microprocessor 48 is programmed to detect incoming calls on line 14 in a number of formats such as power ring signaling using CallerID, a special tone such as a 600 millisecond AT&T tone, or distinctive ringing. Telephone companies typically generate ring signals consisting of alternate intervals of approximately four seconds for generating a sound and approximately two seconds for silence. By changing the duration of the ring signal within the four second interval, different types of distinctive ringing patterns can be generated to invoke different telephone services. Further, the microprocessor 48 is programmed to process incoming telephone calls on the line 14 using any of a number of protocols such as the Analog Display Service Interface (ADSI) protocol developed by Bellcore, or the Utility Telemetry System protocol developed by Bellcore, along with BellSouth and IEEE.

Figure 4A:
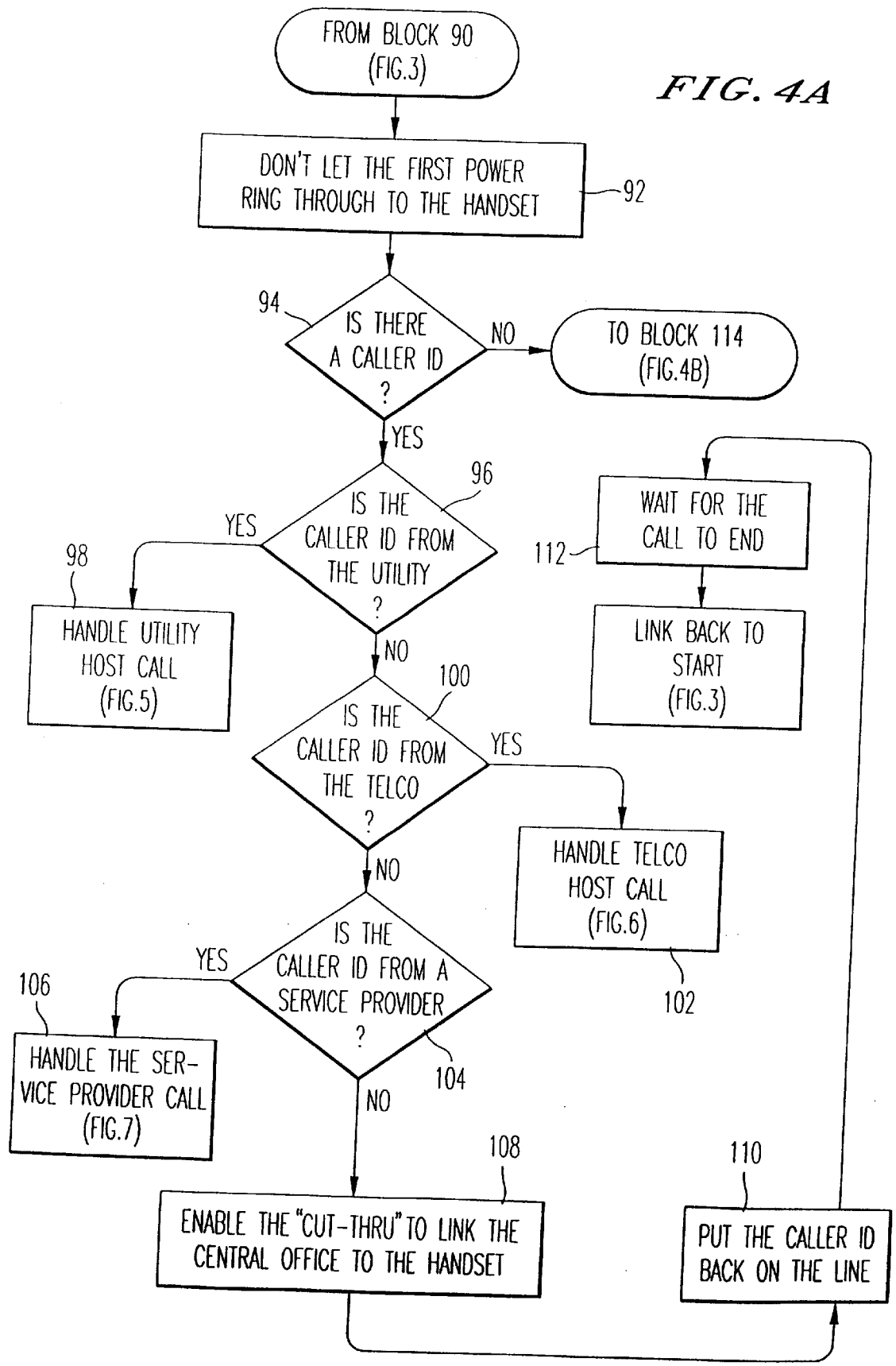
Figure 4B:
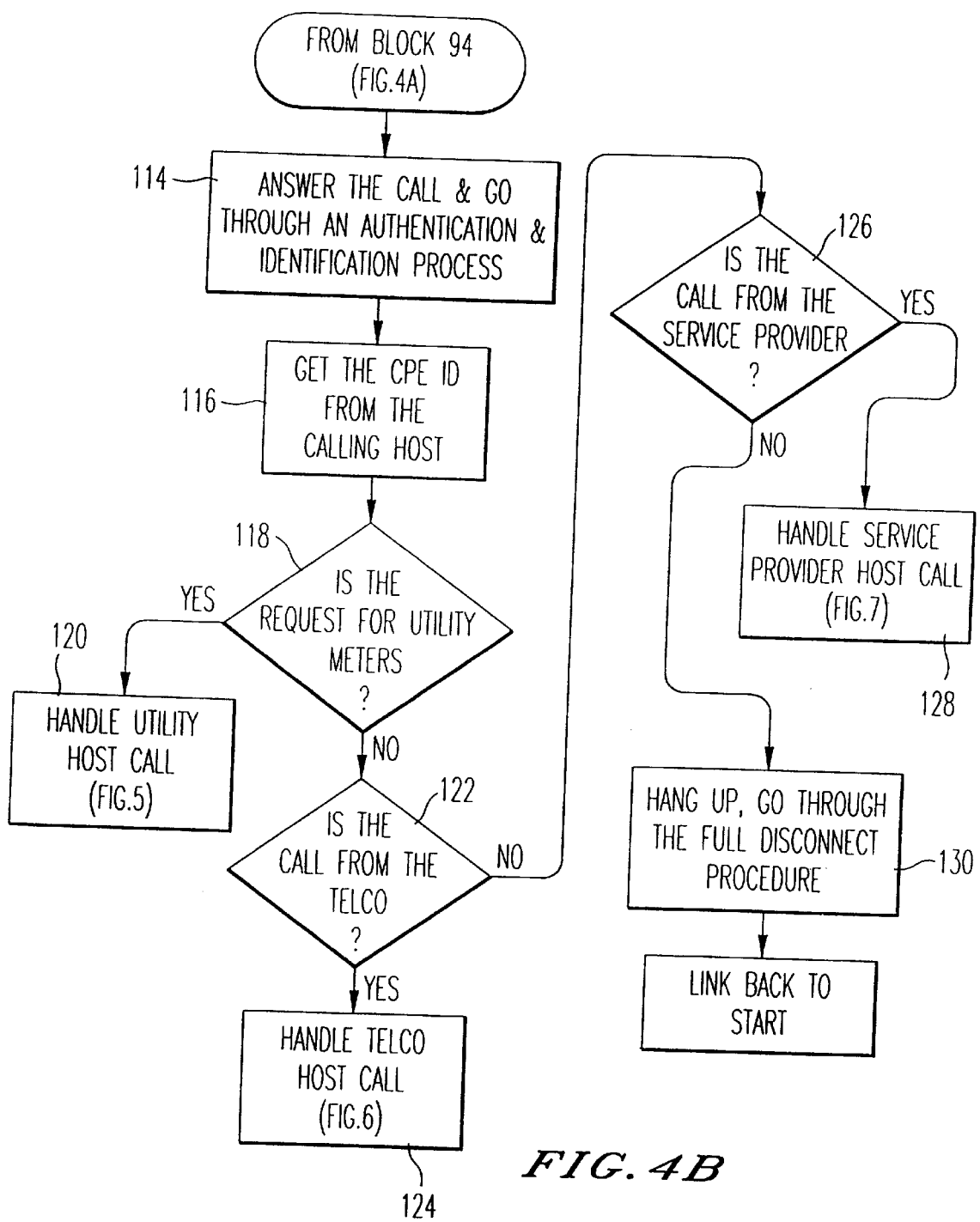

The process for handling an incoming call on the telephone line 14 (e.g., block 90 in FIG. 3) will now be described in further detail with reference to FIGS. 4A and 4B. The microprocessor 48 is programmed to maintain the switch 50 in its normally open position so as not to allow the first power ring signal of the incoming telephone call to ring the telephone 13 or any other CPE 17 connected to line 32 (block 92). With reference to the affirmative branch of decision block 94, if the microprocessor detects CallerID data, the microprocessor 48 stores the CallerID data in the RAM 54 or the internal RAM of the microprocessor 48. The microprocessor 48 compares the CallerID with other CallerIDs which were previously stored in the RAM 54 and which represent valid CallerIDs of host systems 11 of utility companies and information service providers with whom the subscriber wishes to communicate. As indicated by blocks 96 and 98, 100 and 102, and 104 and 106, the microprocessor 48 proceeds to establish a telephone call between one of the subscriber's telecommunications devices 17 and a host system associated with a utility company, the telephone company operating the central office 18 or a service provider, respectively. If the CallerID on the incoming line 14 does not match any of those stored in the RAM 54, the microprocessor 48 is programmed to operate the relay 52 to close the switch 50 and enable the calling party to communicate with the subscriber via a regular voice call on the telephone 13, as indicated in block 108. The microprocessor is programmed to regenerate the CallerID corresponding to the incoming call on the telephone line 14 in order to provide the CallerID on the line 32 (i.e., if the subscriber has purchased a CallerID service from the telephone company), as indicated by block 110. The microprocessor proceeds to monitor the connection between the calling party and the telephone 13 until the call is complete (i.e., the off-hook detection circuit 67 detects that the telephone 13 has gone on-hook), as indicated in block 112, before proceeding to detect when any CPE 17 has gone off-hook or another incoming call is present on the line 14, as indicated by blocks 82 and 88, respectively, in FIG. 3.

With reference to the negative branch of the decision block 94, an incoming call on line 14 having no CallerID between the first and second power ring signals is analyzed by the microprocessor 48 to determine if a distinctive ringing pattern or a special central office tone (e.g., the 600 millisecond AT&T tone) is being used. With reference to block 114 of FIG. 4B, the microprocessor 48 answers the incoming call and undergoes an authentication and identification process whereby the distinctive ringing pattern or the special central office signal is demodulated and compared with data stored in the RAM 54 to determine whether the incoming call is intended by a service provider for one of the CPE 17 connected in parallel to the telephone line 32. The microprocessor 48 subsequently obtains an identification number (hereinafter referred to as a CPE ID) corresponding to the particular CPE 17 requested by the calling host system 11, as shown in block 116. While FIG. 4A illustrates detection of CallerID (block 94) prior to analysis for a distinctive ringing pattern (block 114), the microprocessor 48 can be programmed to analyze a ring signal for a distinctive ringing pattern before detecting CallerID.

The CPE ID is compared with a list of CPE IDs stored in the RAM 54 and corresponding to the meters 24, 38 and 40, the individual pieces of CPE 17 and any appliances 19 at the subscriber premises 12. If the calling host system 11 has requested communication with the electric meter 24, the water meter 38, or the gas meter 40, the microprocessor 48 proceeds to process the incoming call on the line 14 as a utility host call, as indicated in blocks 118 and 120. If the incoming call on line 14 has originated from the central office 18, the microprocessor 48 proceeds to process the call as a telephone company host call, as indicated by blocks 122 and 124. The microprocessor otherwise processes the call on the line 14 as a telephone call originated by an information service provider, as indicated by blocks 126 and 128. If the call however did not originate from a valid host, the microprocessor is programmed to hang up and undergo a full disconnect procedure (block 130) using the line interface circuit 44. Thus, a call originating from an invalid host can be processed and disposed of without having to involve the telephone line 32 or any of the CPE 17 connected to the line 32.

Since the host systems 11 contact subscribers via the PSTN, that is, via the subscribers' respective telephone lines 14, the system 10 of the present invention operates independently of the type of switch used by the telephone company. Telephone companies are required to give at least basic service for the establishment of connections to subscribers' telephone lines using their assigned numbers. The system 10 of the present invention therefore can be used without requiring modification of telephone company switches.

Figure 5:
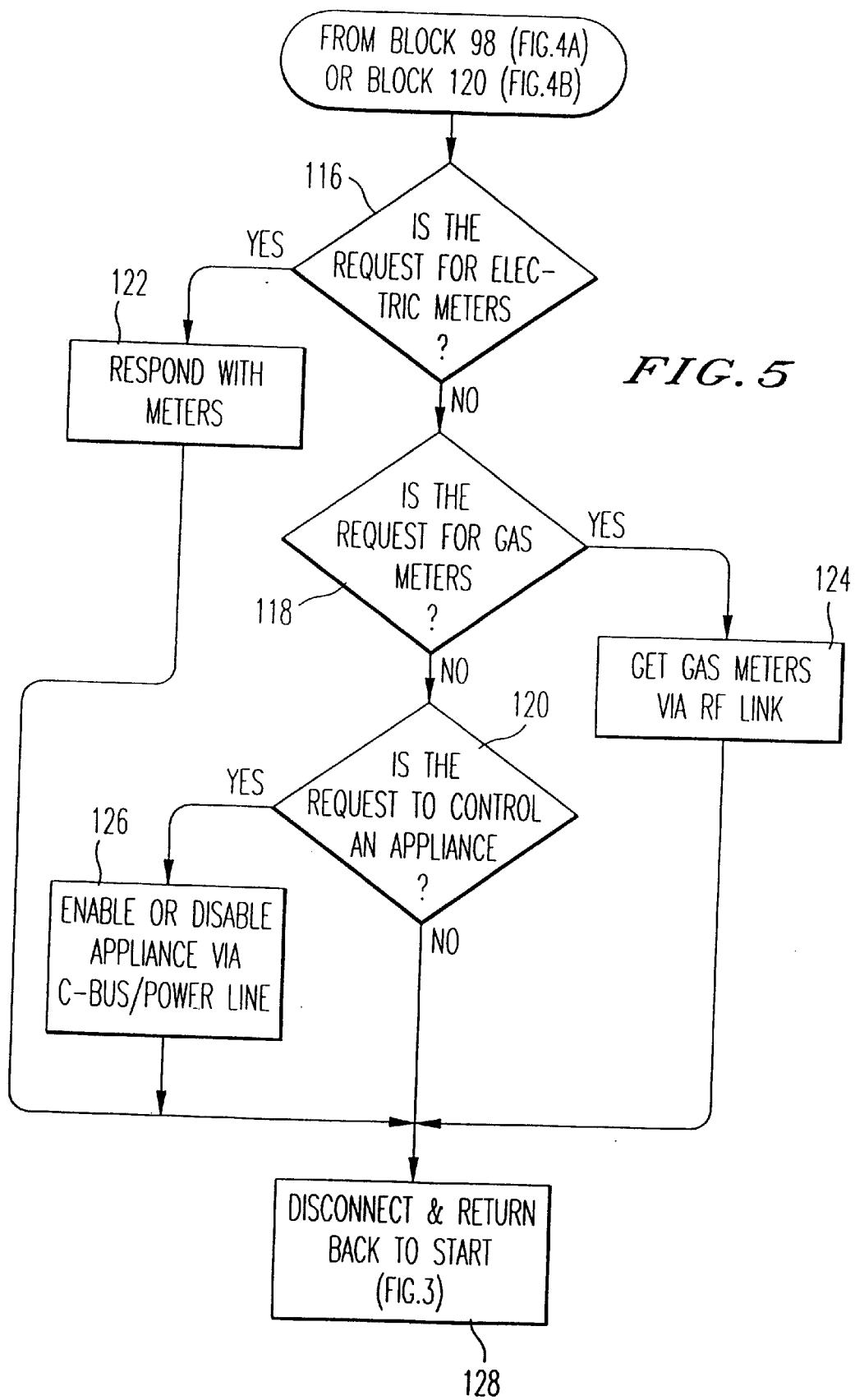

With reference to FIG. 5, the microprocessor 48 determines from the CallerID, the distinctive ringing pattern, or the special central office signal, of the incoming call on line 14 whether or not the incoming call is a request for information from the electric meter 24, the gas meter 40, the water meter 38 or other device connected to the microprocessor 48 via the radio frequency transceiver 64, as indicated by blocks 116 and 118. Further, the microprocessor 48 determines if the incoming call is a request from the subscriber, for example, to control an appliance 19, as indicated by block 120. As indicated in blocks 122 and 124, the microprocessor 48 can receive data from the utility meters 24, 38 or 40 via the RF transceiver 64, and provide the data to the line 14 using the modem 66 and the line interface circuit 44. As stated previously, information from an electric meter 24 can be obtained using an adapter 22. Meter readings can be obtained from other types of meters using the RF transceiver 64 or other communication device. If the incoming call is a request to control an appliance 19, the microprocessor 48 is programmable to enable and to disable an appliance 19 using the CE-Bus interface 70 and the power line 42, as indicated in block 126. The microprocessor 48 subsequently terminates the call on line 14 by going off-hook using the line interface circuit 44, as indicated in block 128. Thus, these services can be done without involving the telephone line 32, that is, the ring signal is suppressed and the incoming call does not ring through to the devices 17.

Figure 6:
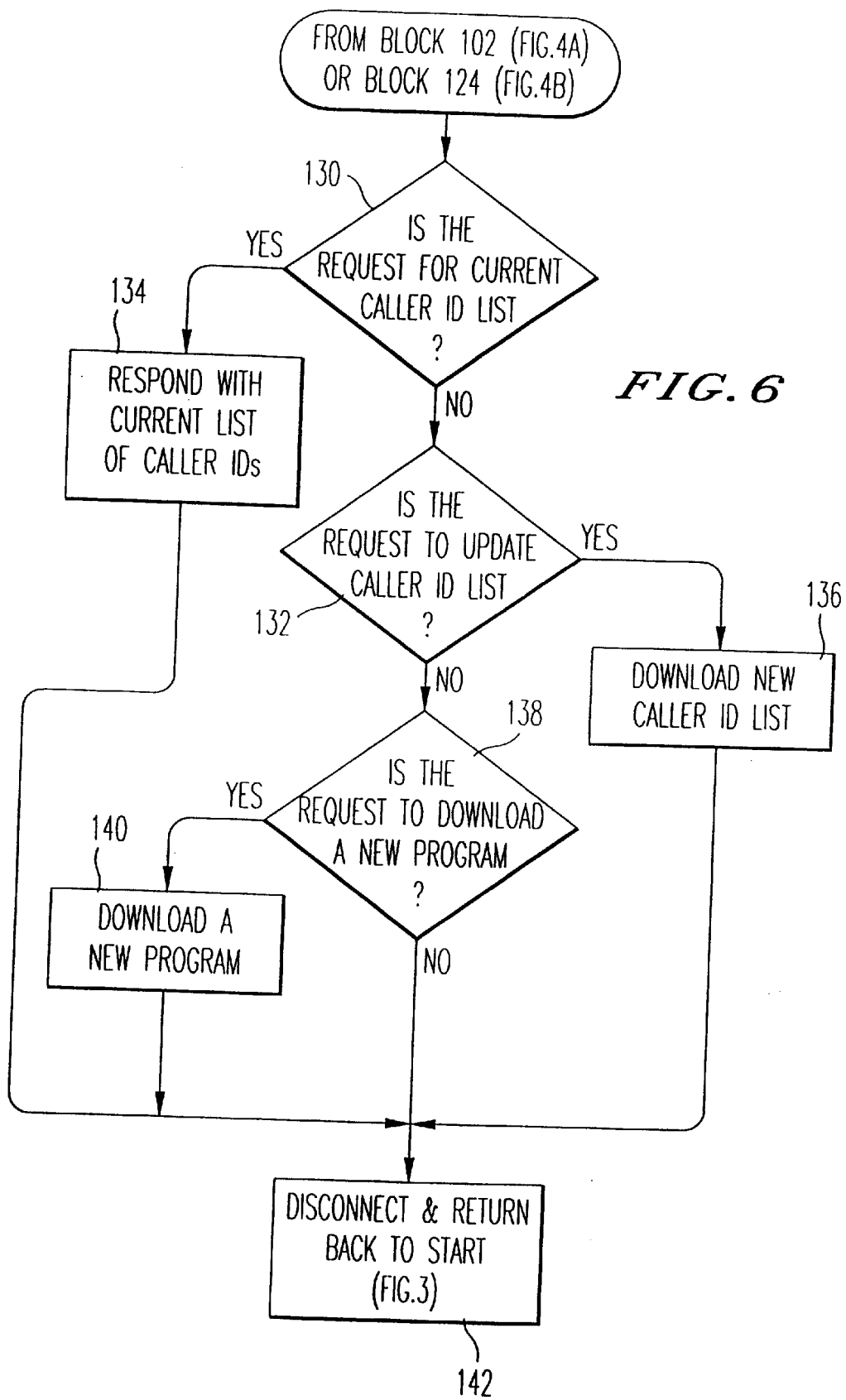

If the incoming call on line 14 is from the telephone company operating the central office 18 and acting as a host system 11, the microprocessor 48 determines from the incoming call whether the telephone company is requesting a current CallerID or distinctive ring signal list, or is requesting to update the CallerID or distinctive ring signal list stored in the RAM 54, as indicated in block 132 (FIG. 6). The microprocessor 48 proceeds to provide the host telephone company with the current list of CallerIDs or distinctive ring signals using the modem 66, as indicated in block 134. To update the CallerID list stored in the RAM 54, the microprocessor 48 proceeds to download a new CallerID list or a new distinctive ring pattern (i.e., a pattern of specified amplitude and duration) received via the line interface circuit 44 into the RAM 54, as indicated in block 136. Similarly, the microprocessor 48 can store a new program downloaded from the telephone company host system, as indicated in blocks 138 and 140. The microprocessor 48 subsequently disconnects the system 10 from the telephone company host system, as indicated in block 142.

Figure 7:
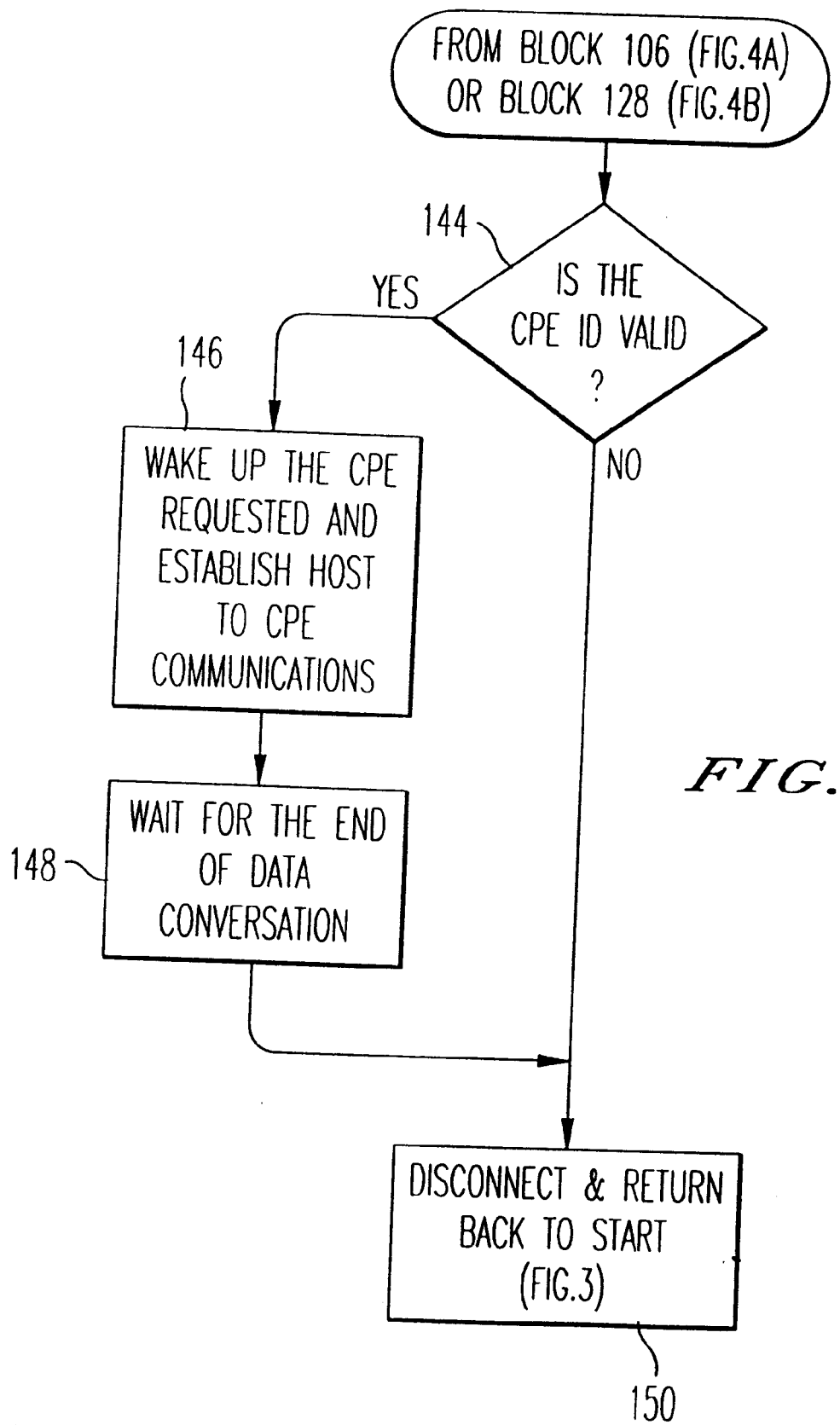

With reference to FIG. 7, each piece of CPE 17 is programmed to monitor the line 32 for a valid CPE ID to determine whether or not the incoming call on line 32 is intended for that particular CPE. In accordance with the ADSI or a similar communications protocol, the CPE ID is provided by the host system after a connection to the system 10 has been made regardless of whether distinctive ringing or CallerID was used by the microprocessor 48 to determine whether or not to answer the incoming call. The device for which the incoming call is intended subsequently goes off-hook and communicates with the host system 11, as indicated in block 148. The microprocessor 48 monitors the line 32 to determine when the CPE involved in the current data call goes back on-hook and subsequently proceeds to disconnect the host system 11 from the system 10, as indicated in block 150.

Figure 8:
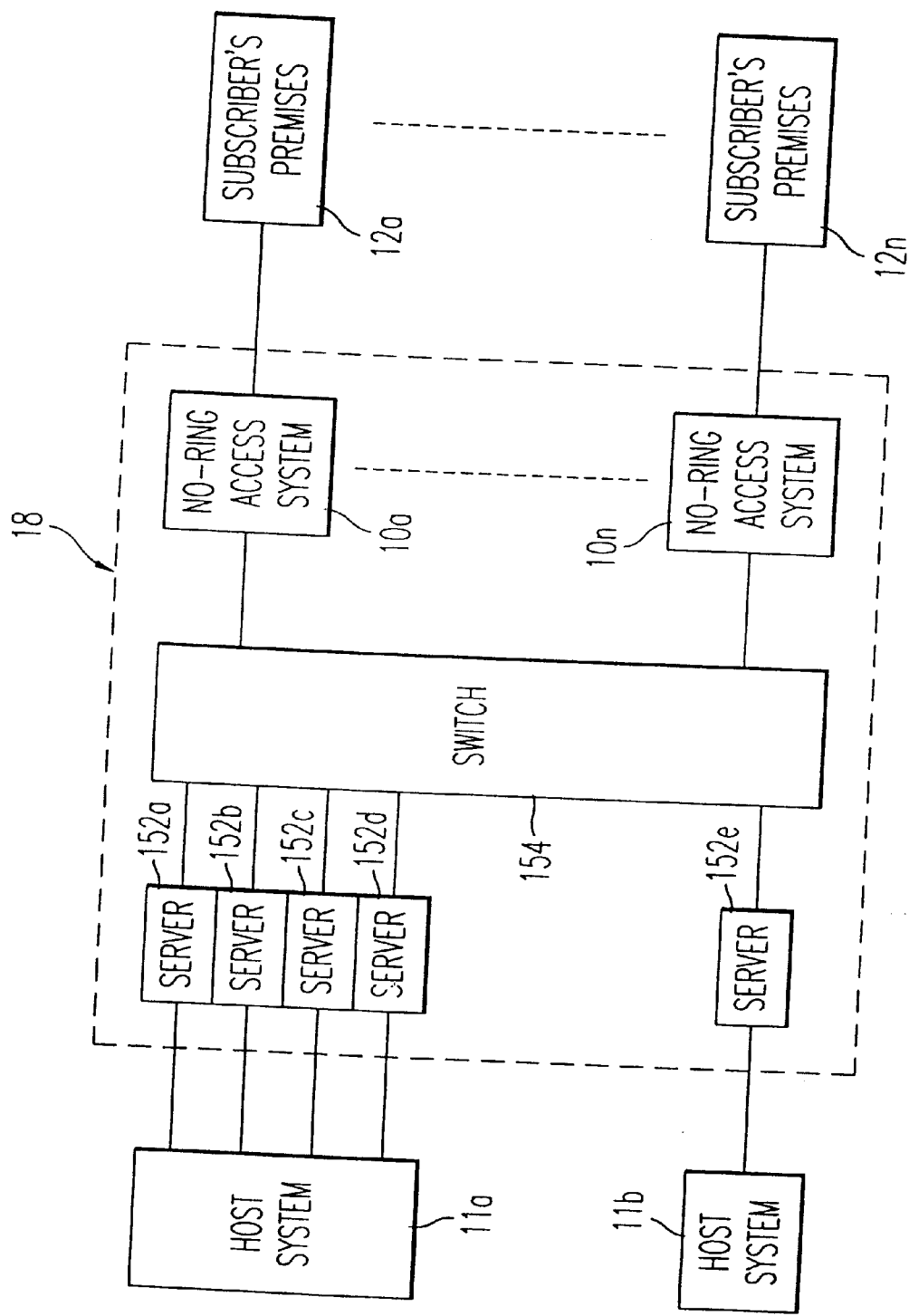
FIG. 8 is a schematic block diagram of a telecommunications system constructed in accordance with an embodiment of the present invention and connected to a central office switch.

As stated previously, the system 10 can be connected to the line side of a switch 154 at the central office 18, as shown in FIG. 8. A utility company or information service provider 11b can be provided with a single telephone number (e.g., an 800 number) by the telephone company for establishing a telephone connection with a corresponding server 152e. As shown in FIG. 8, a host 11a can have several servers 152a, 152b, 152c and 152d and therefore several telephone numbers for accessing the switch. Each utility company and information service provider can then instruct its server(s) 152 as to which subscribers that utility company or information service provider would like to establish contact. The server 152 subsequently instructs the switch 154 as to which channel to open to allow the host 11 to access a selected subscriber 12. The server 152 and the switch 154 operate to dial the selected subscribers' telephone numbers to establish telephone connections. Each of the host systems 11a and 11b thereby has a global broadcast capability which eliminates expenditure of time for call set-up for each if these telephone connections. Loop alerting on a particular loop having the system 10 installed thereon is obtained either from loop make-up records, or by testing at the subscriber premises until a value is found that achieves no-ring access. This value of loop alerting signal (e.g., no-ring, abbreviated ring of a certain duration, or digital loop carrier (DLC), OSI protocol) is then loaded into the memory of the system 10 by the central office 18 at the time of installation. For subsequent identified telemetry calls to the system 10, the system 10 applies the loop alerting value obtained from its RAM 54 whenever it does not receive such a value from the server 152, or any other means to open a time slot and provide the utility company or information provider with the no-ring access to the subscriber. Alternatively, a utility company or information provider can make calls using the trunk system as opposed to a digital loop carrier system. In the trunk system, the host systems 11a and 11b of the utility companies and information providers dial into their respective servers 152 on the trunk side of the switch 154 at the central office 18 to instruct the server 152 of the task the utility company or information service provider intends to accomplish. The server 152 subsequently places the regular PSTN telephone call to the associated system 10. When the system 10 is connected to the called line 14, the server 152 signals the CPE 17, appliance 19, or meter 24, 38 or 40 on the line side with the appropriate instructions. The systems 10 on the line side of the switch 154 already have the correct value of loop alerting signal installed to open up a time slot and connect the host server 152 to the appropriate CPE 17 at the subscriber's premises 12.

Figure 9:
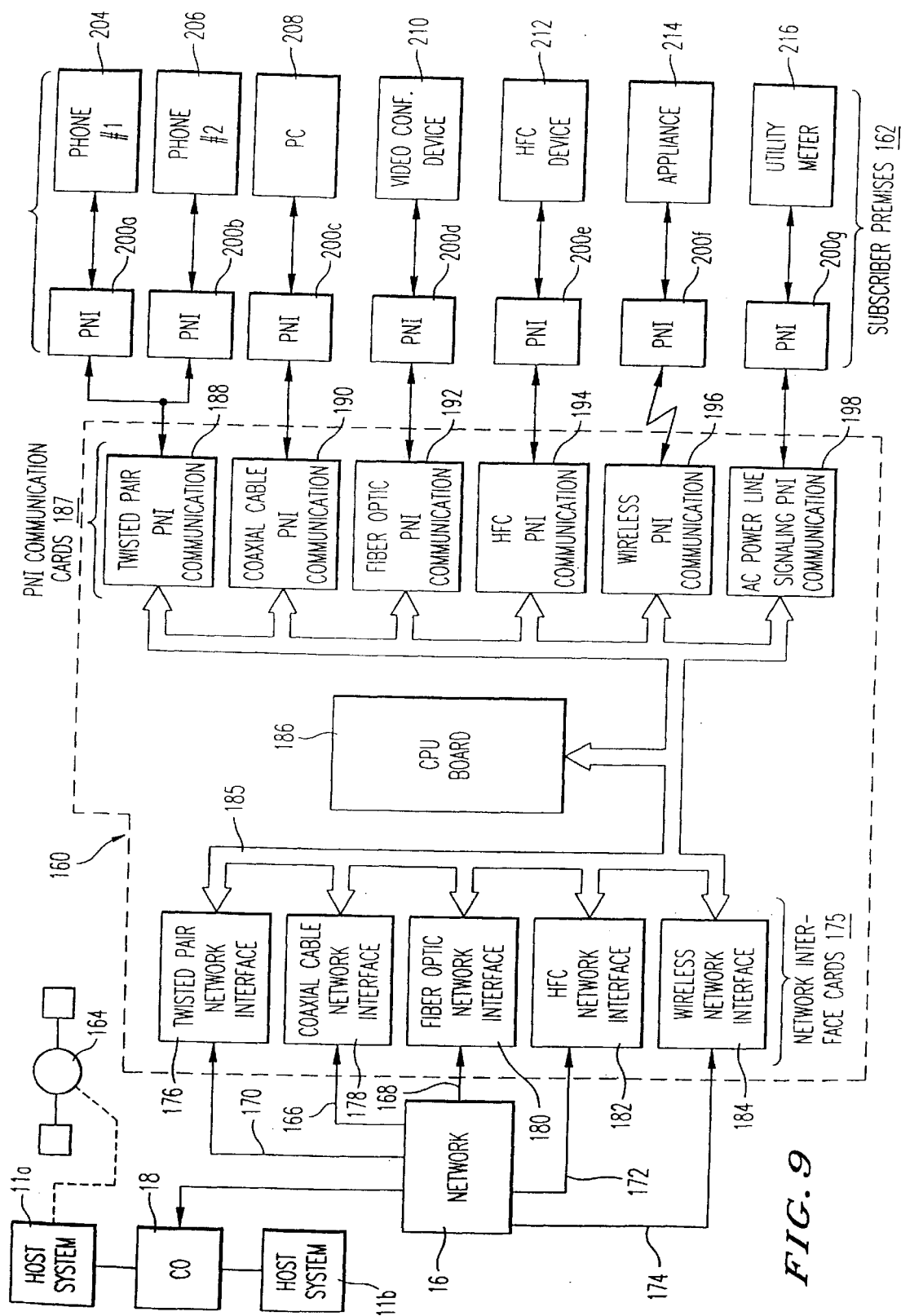
FIG. 9 is a schematic block diagram of a premises gateway constructed in accordance with an embodiment of the present invention.

In accordance with another embodiment of the present invention, a premises gateway (PG) 160 is connected at the demarcation point between the central office (CO) 18 and a subscriber's premises indicated generally at 162 in FIG. 9. The PG 160 is configured to manage both narrow band and broadband communications with various host systems 11 via a network 16. For example, a host system 11a can receive a telephone call destined for a device at the subscriber's premises 162 via a satellite 164. The host system 11a establishes a connection with the PG 160 via a broadband communication link such as a coaxial cable link 166 or a fiber optic link 168. By way of another example, a host system 11b can communicate with an analog telephone or a personal computer (PC) at the subscriber's premises by way of a twisted pair 170 and the PG 160. The PG 160 is configured to communicate with different host systems through the network 16 via different transmission media such as a hybrid fiber optic coaxial link 172, or a radio frequency (RF) link 174, among others, and different signal protocols. The PG 160 is therefore advantageous because it allows a remote user or system (e.g., host system 11a or 11b) to communicate with a device (e.g., an appliance, a personal computer, or a telephone) located at a subscriber's premises 162 via different transmission media and protocols. In addition, the PG 160 communicates with premises network interfaces connected to respective devices at the subscriber's premises 162, as will be described in further detail below. The PG 160 and the premises network interfaces permit nodes (e.g., telephone wall jacks, AC power outlets and radiofrequency-controlled devices) at the subscriber's premises 162 to be addressed individually, which is yet another advantage of the present invention. The premises network interfaces shall hereinafter referred to as PNIs and are indicated generally at 200 in FIG. 9.

In accordance with an embodiment of the present invention, the PG 160 is provided with different network interface cards indicated generally in FIG. 9 at 175, and different premises network interface (PNI) communication cards indicated generally at 187. The network interface cards 175 provide the PG 160 with interfaces to the network 16 via different transmission media. The PNI communication cards 187 provide the PG 160 with interfaces to PNIs 200 and the corresponding devices connected thereto at the subscriber's premises 162 via different transmission media.

The network interface cards 175 and the PNI communication cards 187, which are described in more detail below, can be selected and interchangeably inserted in card slots (not shown) in the PG 160 to configure the PG 160 for essentially any application with relative ease. With further reference to FIG. 9, the PG 160 comprises a central processing unit (CPU) board 186 which uses a bus 185 to communicate with the network interface cards 175 and the PNI communication cards 187 and to route signals between the network interface cards 175 and the PNI communication cards 187. As will be described in connection with the flow charts in FIGS. 16–21, the CPU board 186, the network interface cards 175, the PNI communication cards and the PNIs are operable to route signals between users or host systems 11 and devices at a subscriber's premises 162 via essentially any combination of transmission media. In other words, network 16 signals received at the PG 160 via a first type of transmission media can be routed to a particular device at the subscriber's premises via the same media or a second type of transmission media.

Figure 10:
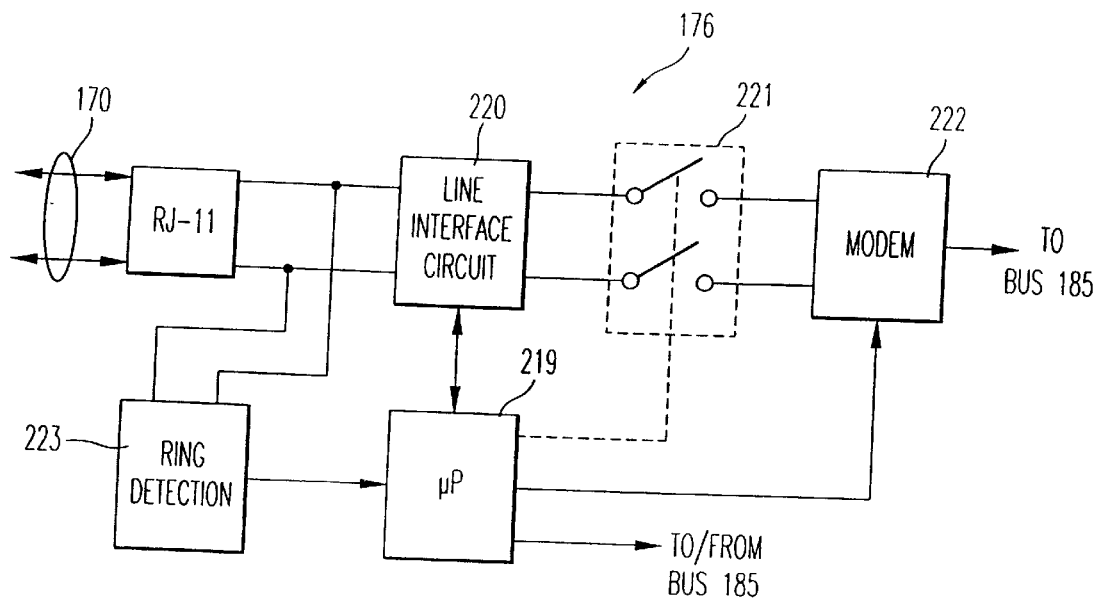
FIG. 10 is a schematic block diagram of a twisted pair network interface card constructed in accordance with an embodiment of the present invention.

One example of a network interface card 175 is a twisted pair network interface card 176. The twisted pair network interface card 176 can be used for high speed information transmitted via a twisted pair 170, such as ADSL-formatted data, as well as narrow band plain old telephone service (POTS). The twisted pair network interface card 176 is configured in accordance with the present invention to decode information from the network 16 which is formatted in accordance with any protocol (e.g., ADSL or POTS). The twisted pair network interface card 176 comprises circuitry, as shown in with FIG. 10, for receiving and processing signals from a twisted pair (e.g., the twisted pair 170) to allow for further processing of the signals by the CPU board 186. For illustrative purposes, the twisted pair network interface card 176 is provided with an RJ-11 connector 218 for connection with the twisted pair 170. A line interface circuit 220 and a modem 222 are provided to process analog signals on the incoming lines 170 for transmission as digital signals on the bus 185 to a PNI communication card 187, as determined by the CPU board 186. The twisted pair network interface card 176 further comprises a switching device 221 which operates in accordance with command signals generated by microprocessor 219 on the twisted pair network interface card 176. The line interface circuit 220 comprises a ring detection circuit 223 which informs the microprocessor 219 when a ring signal corresponding to an incoming analog telephone call is received from the network 16. The microprocessor 219 is programmed in accordance with the present invention to open the switching device 221 to prevent the telephone call from being transferred to the bus 185. The microprocessor 219 is programmed to communicate with the CPU board 186 to indicate that an incoming telephone call from the network 16 has been received at the twisted pair network interface card 176. The line interface circuit 220 then processes the dual-tone, multi-frequency (DTMF) information transmitted via the network to identify the called party. The microprocessor 219 provides the called party information to the CPU board 186 which, in accordance with an aspect of the present invention, determines to which device at the subscriber premises 162 the incoming telephone call is directed. The CPU board 186 then instructs the microprocessor 219 to close the switching device 221 so that the incoming call can be routed on the bus 185 to the PNI communication board 217 determined by the CPU board 186 to be able to communicate with the PNI connected to the device. The line interface circuit 220 can also be provided with circuit components for processing data received via the twisted pair 170. Different implementations will be discussed in further detail below for transmitting broadband data via the twisted pair 170 simultaneously with the transmission of narrow band signals such as analog voice signals.

With continued reference to FIG. 9, the PG 160 can also be provided with one or more other network interface cards 178, 180, 182 and 184 to manage signaling with the central office 18 via, respectively, a coaxial cable 166, a fiber optic link 168, a hybrid fiber optic/coaxial cable or BFC link 172, and a wireless link 174 such as an infrared or radio frequency (RF) link. By way of an example, the coaxial cable network interface card 178 can be used to receive POTS from the network 16 via the coaxial 166, as opposed to the twisted pair 170. The network interface cards 176, 178, 180, 182 and 184 are provided in FIG. 9 for illustrative purposes. It is to be understood that in accordance with the present invention, other network interface cards can be provided to facilitate reception at the PG 160 of other types of signals or information via other types of transmission media than the exemplary media and protocols discussed herein.

In accordance with another aspect of the present invention, the subscriber's premises 162 can be provided with a Premises Network Interface (PNI) 200 at each of a plurality of nodes. The PG 160 is provided with at least one type of PNI communication card to communicate with a PNI, and therefore the device connected to the PNI, via the transmission media and method used to connect the PNI to the PG 160. For example, a twisted pair PNI communication card 188 can be connected to the CPU board via the bus 185 to communicate with a PNI 200a connected to a telephone 204 or a PNI 200b connected to another telephone 206 at a different RJ-11 outlet within the subscriber's premises 162. For example, the PNIs 200a and 200b can be connected to two telephone jacks located, respectively, on the upper and lower levels of the subscriber's house. These two telephone jacks correspond to the nodes. A PNI which is connected to a device that can be controlled via radiofrequency signals, as opposed to signals transmitted via a telephone line to a physical telephone wall jack, is also recognized as a node by the CPU board 186.

As will be described below in connection with FIGS. 17–24, the CPU board 186 is programmed to perform a number of network functions and to communicate with one or more PNIs connected to individual nodes throughout the subscriber's premises 162 in order to communicate with devices connected to those particular nodes. In other words, the PG 160 and the PNIs 200 are configured to allow the PG 160 to direct an incoming call from the central office 18 to a specific node (i.e., a specific telephone wall jack) within the subscriber's premises 162 for direct access to the end device connected at that node. For example, if the PG 160 determines that an incoming call from the central office 18 is directed to a PC 208 connected to a PNI 200c at a particular node, as shown in FIG. 9, the PG 160 communicates with the PNI 200c via a coaxial cable PNI communication card 192 to instruct the PNI 200c to wake up the PC 208 and initiate communication therewith. After the PNI 200c establishes a connection with the PC 208, the PNI 200c communicates with the PG 160 to indicate that a call can be sent to the PC 208. In addition, the PG 160 can be programmed to send messages from the PC 208 to a host system 11, to send a message to the PNI 200c only and not the PC 208, and to receive messages from the network 16 and the PNI 200c.

With continued reference to FIG. 9, PG 160 can also be provided with one or more of the PNI communication cards 190, 192, 194, 196 and 198 which are configured, respectively, to communicate with PNIs at various nodes throughout the subscriber's premises 162 via coaxial cable, fiber optic links, HFC links, wireless communication links and signaling via AC power lines. The bus 185 connects the CPU board 186 to the PNI communication cards 187 provided in the PG 160.

Figure 11:
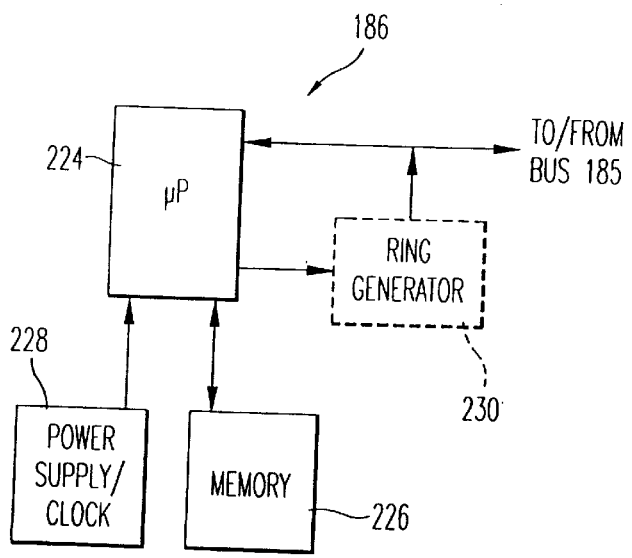
FIG. 11 is a schematic block diagram of a central processing unit board constructed in accordance with an embodiment of the present invention.

As stated previously, the CPU board 186 routes signals from the various network interface cards 175 and provides the signals to selected ones of the PNI communication cards 187. For example, a telephone call from a utility company can be transmitted from the network 16 via a coaxial cable link 166. The utility company can designate the call recipient as a meter 216 on the subscriber's premises and request a meter reading. The PG 160 receives the incoming call via the coaxial cable network interface 178. With reference to FIG. 11, the CPU board 186 comprises a microprocessor 224 and associated power supply and timer circuitry indicated generally at 228. The microprocessor 224 is programmed to perform a process similar to the call handling process described above in connection with FIGS. 3, 4A, 4B, 5, 6 and 7. By way of an example, the microprocessor 224 performs look-up operations from a memory device 226 to determine the destination of the incoming call using one of a distinctive ringing pattern, special tones or caller ID associated with the incoming call.

Figure 12:
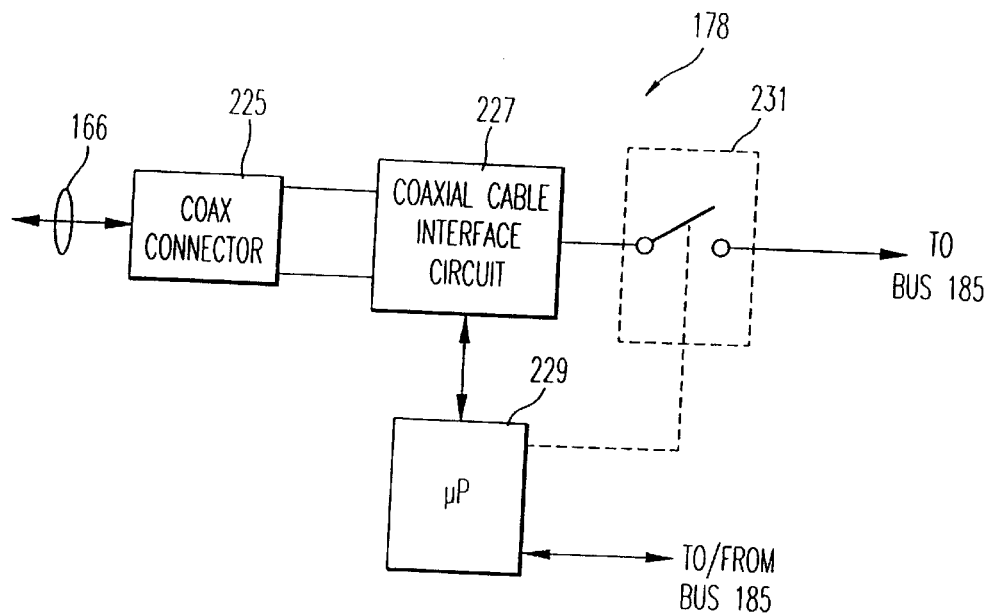
FIG. 12 is a schematic block diagram of a coaxial cable network interface card constructed in accordance with an embodiment of the present invention.

As shown in FIG. 12, the coaxial cable network interface card 178 preferably comprises a connector 225 for connecting to the coaxial cable 166, a coaxial cable interface circuit 227, a microprocessor 229, and a switching device 231 that is opened or closed in response to signals from the microprocessor. The coaxial cable interface circuit 227 comprises conventional circuitry (not shown) for demultiplexing and decoding signals received via the coaxial cable 166. The remaining network interface cards 180, 182 and 184 are similar to the network interface cards 176 and 178 described, respectively, in connection with FIGS. 11 and 12 in that the network interface cards 180, 182 and 184 also preferably comprise an interface circuit for performing such functions as decoding of signals received via the corresponding transmission media 168, 172 and 174. Further, the network interface cards 180, 182 and 184 each comprise a microprocessor and a switching device in response to signals from the microprocessor. The microprocessor on each of the network interface cards 180, 182 and 184 is preferably programmed to communicate with the microprocessor 224 on the CPU board 186 to open and close the corresponding switching device in accordance with signals from the microprocessor 224. Thus, the microprocessor 224 can instruct each of the network interface cards 187 to suppress access to any of the devices at the subscriber premises 162 via the corresponding switching device (e.g., the switching device 231 in the coaxial cable network interface card 178) until the microprocessor 224 can determine if the incoming call is intended for one of the devices 186. For example, the microprocessor 224 can determine that the ringing pattern of the incoming call matches a pattern stored in the memory device 226 for addressing a meter 216 via an RF communications link. The microprocessor 224 subsequently controls the no-ring access switching device 221 on the twisted pair network interface card 176 to close and place the call on the bus 185 in a manner that is determined by the microprocessor 224 to route the incoming call to the PNI communication card 198 for AC power line signaling. The PNI communication card 198, in turn, instructs the PNI 200g to establish communication with the meter 216. The meter 216 can then return a meter reading to the PNI 200g for transmission to the utility company via the PG 160.

Figure 13:
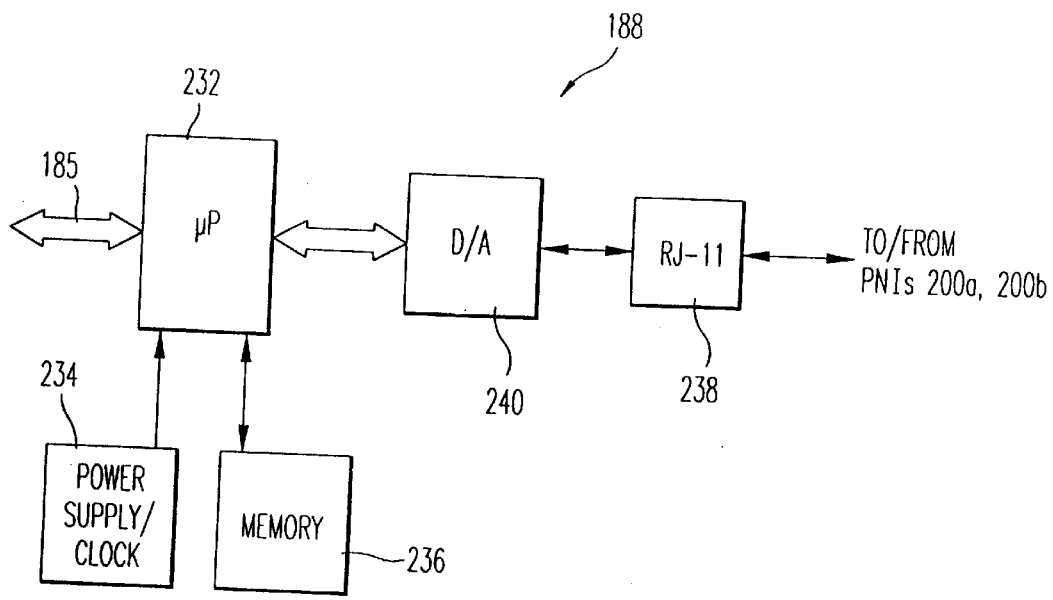
FIGS. 13–15 are a schematic block diagrams of premises network interface cards constructed in accordance with an embodiment of the present invention.
Figure 14:
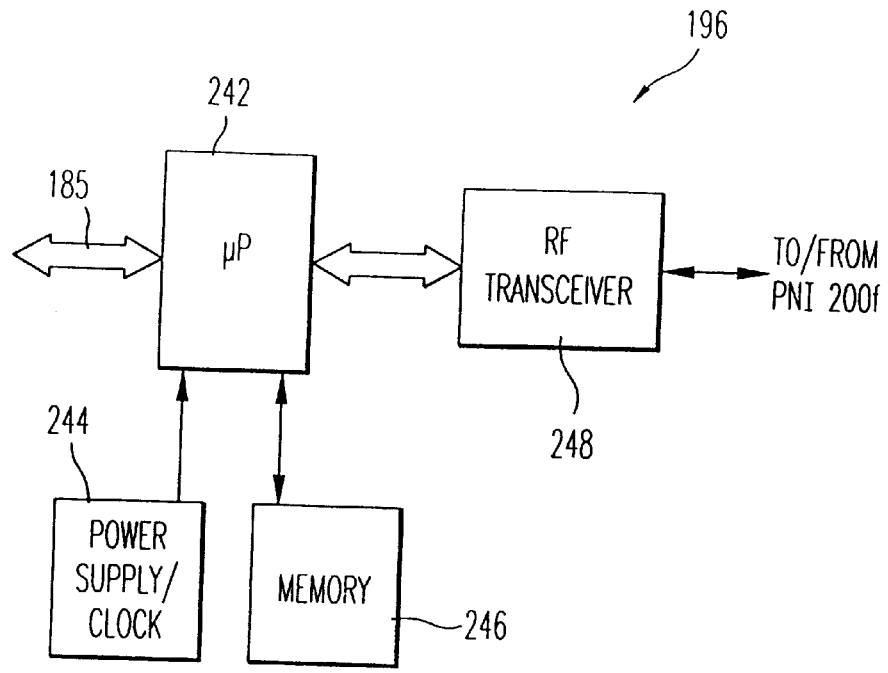
Figure 15:
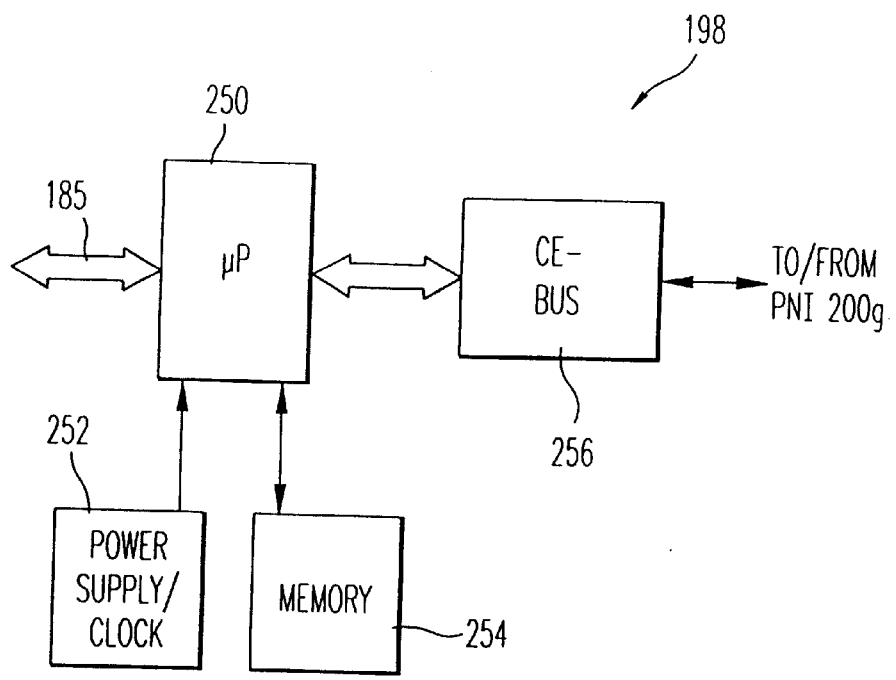

Alternatively, the meter 216 can be connected to the PG 160 via a wireless communication link. Accordingly, the microprocessor 224 directs the signaling from the utility company to the wireless PNI communication card 196. Three different types of PNI communication cards are depicted in FIGS. 13–15 for illustrative purposes. Other circuit designs for PNI communication cards 187 within the scope of the present invention. The exemplary twisted pair PNI communication card 188 in FIG. 13 preferably comprises a microprocessor 232 for controlling the processing of signals received from the bus 185 or from a PNI 200a or 200b via an RJ-11 connector 238. The microprocessor 232 has associated housekeeping and memory circuits 234 and 236. The microprocessor is programmed to convert digital signals from the bus 185 into analog signals using a digital-to-analog (D/A) converter such as a modem 240. Further, the modem 240 converts analog signals from the devices 200a and 200b into digital signals for transmission to the network 16 via the microprocessor 224 on the CPU board 186. The exemplary PNI communication cards 196 and 198 depicted in FIGS. 14 and 15, respectively, are similar, except for the type of interface circuit needed to communicate with the PNI. Instead of a modem 240 and RJ-11 connector 238, the wireless PNI communications card 196 comprises an RF transceiver 248 for communicating with a corresponding RF transceiver in the PNI 200f. Similarly, the AC power signaling PNI communications card 198 comprises a CE-bus 256 for transporting signals from the PG 160 to the PNI 200g via power lines, as opposed to a modem 240 and RJ-11 connector 238. As stated previously, the PG 160 can be configured with different numbers of different types of network interface cards 175 and PNI communication cards 187, depending on the application for which the PG 160 is being employed. The PG 160 is advantageous because inbound and outbound calls received on one type of medium can be directed to the intended call recipient on another type of medium. For example, the CPU board 186 can receive a call for a particular node at the subscriber's premises which is from a fiber domain and has a header. The CPU board 186 can determine which node the call is intended by performing look-up operations from a memory device, for example, to determine which node corresponds to the header. The CPU board 186 can instruct the PNI 200a, which is connected to an RJ-11 telephone jack, to generate a ring signal to contact the device for which the fiber optic call is intended, for example.

Figure 16:
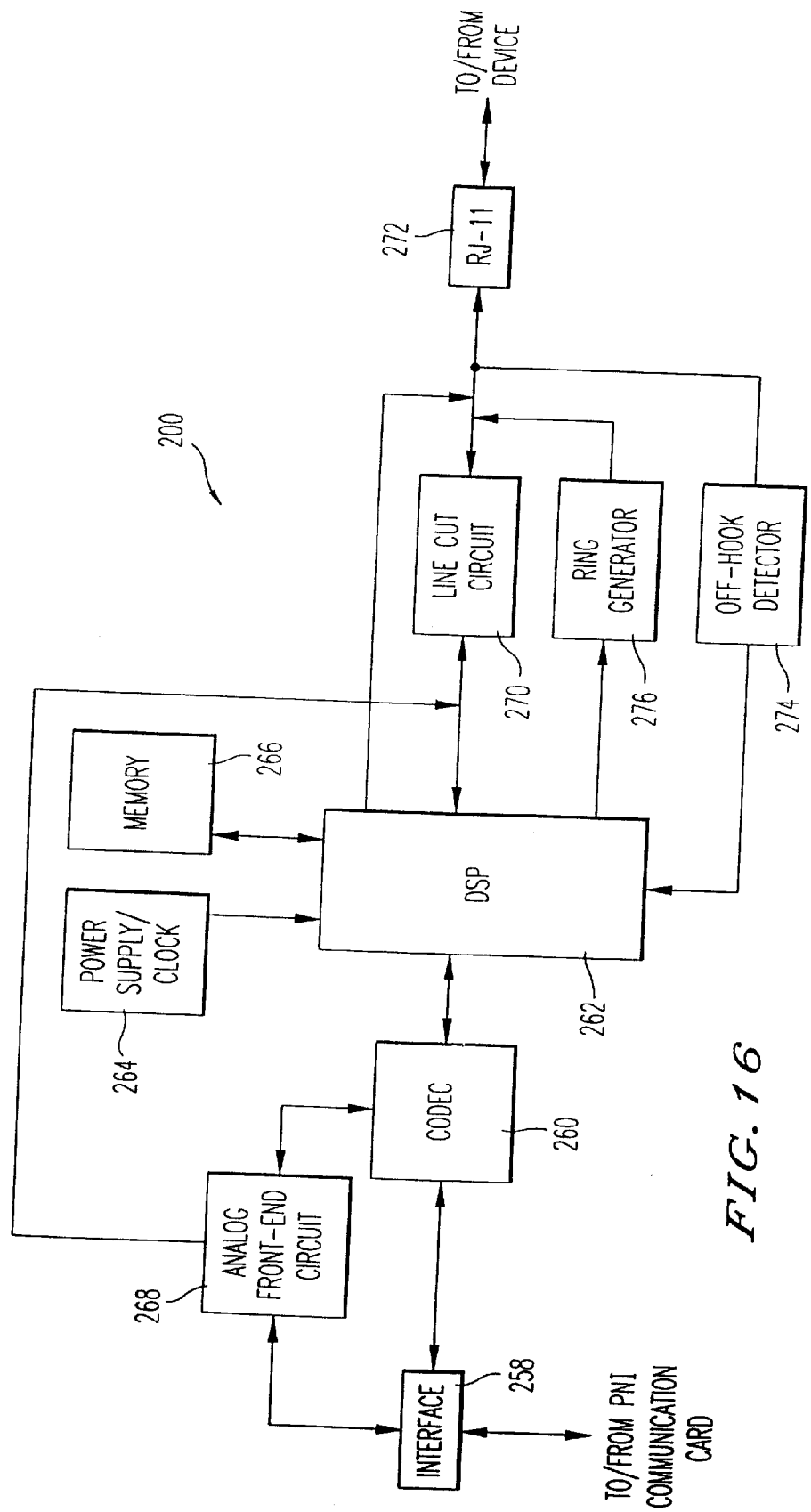
FIG. 16 is a schematic block diagram of a premises network interface constructed in accordance with an embodiment of the present invention.

FIG. 16 is a schematic block diagram of a PNI 200 which is connected to a node at the subscriber's premises 162. The PNI 200 comprises an interface device 258 having circuit components for communicating with at least one of the PNI communication cards 187. For example, the interface device 258 can comprise one or more of the following: an RJ-11 connector, a coaxial cable connector, a fiber optic terminal, an HFC terminal and a RF transceiver. The PNI 200 is provided with a codec 260 for converting signals from the PG 160 into digital signals that can be further analyzed and processed by a digital signal processor (DSP) 262. The DSP 262 has associated housekeeping and memory circuits 264 and 266. An analog front-end circuit 268 is also provided to process analog signals received from the PG 160 for conversion by the codec 260. In accordance with an aspect of the present invention, the DSP 262 is programmed to operate a line cut circuit 270 in accordance with signals from the microprocessor 224 to control the transmission of signals between the PNI communication card and the device, which is preferably connected to the PNI via an RJ-11 connector 272. In accordance with an embodiment of the present invention, the DSP 262 is configured to close the line cut circuit 270 to communicate with the device to establish a connection thereto and to determine its on-hook or off-hook status using an off-hook detector 274. The microprocessor 224 also instructs the other PNIs 200 to open their respective line cut circuits. 270 to suppress access to the corresponding devices connected thereto. If the device has gone off-hook, the DSP 262 can send a message to the microprocessor 224 in the PG 160 reporting the off-hook condition. The microprocessor 224 can then defer transmission of network messages to the device until the device returns to on-hook status. The DSP 262 can initiate the operation of a ring generator 276 to provide a ring signal to the device to wake up the device. Once the device answers the ring signal and indicates its availability to receive signals from the network 16, the DSP 262 sends a message to the microprocessor 224, which subsequently controls the switching device 228 to route the network signals to the device via its PNI.

Thus, in accordance with one aspect of the present invention, two switching devices are used. For example, a switching device at a network interface card 178 such as the switching device 221, and a line cut circuit 270 on each PNI 220 are used to suppress access to a device until it is authorized by the microprocessor 224. When a call is received from the network 16, the network interface card 178 connected to the transmission media on which the incoming call is being transmitted closes its switching device (e.g., switching device 221 or 231) and reports the call to the CPU board microprocessor 224. The microprocessor 224 processes the distinctive ringing pattern, DTMF tones or other information sent to indicate the called party or device and performs a look-up operation to determine to which PNI communication card 187 the call needs to be routed in order to communicate with a selected device at the subscriber's premises 162.

The microprocessor 224 preferably communicates with the PNIs 200 to instruct selected PNIs 200 to open or close the lines to the device(s) via the respective line cut circuits 270. For example, the microprocessor 224 can command all of the PNIs 200 which are connected to devices intended to receive an incoming call to close their respective line cut circuits 270. In the illustrated embodiment, the PNIs 200 are each provided with a ring generator 276 or other circuit for signaling the device connected thereto to indicate an incoming call. In an alternative embodiment, the CPU board 186 comprises a ring generator 230 for sending a ring signal to the PNIs 200 via the bus, as opposed to the PNIs 200. Thus, the microprocessor 224 can generate a ring signal or other signal to wake up selected devices. The microprocessor 224 can also command the remaining PNIs 200 to maintain their line cut circuits 270 in open positions to prevent ringing of devices for which incoming signals are not intended. In addition, the line cut circuits 270 can each be maintained in a normally closed position, and the microprocessor 224 can operate the line cut circuits 270 of selected PNIs 200 to open when the microprocessor 224 determines that an incoming call is not intended for devices connected to these PNIs 200.

Figure 17:
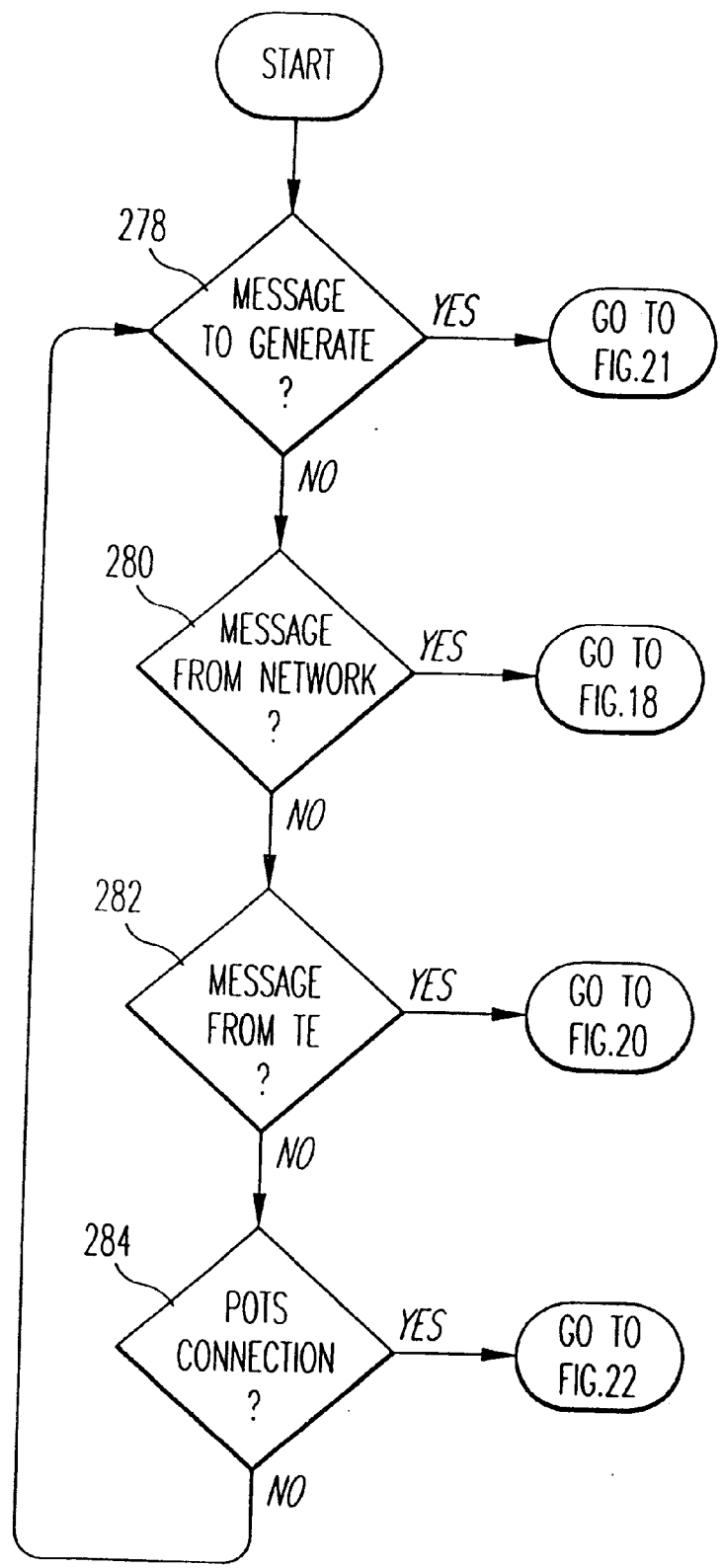

With reference to FIG. 17, a Premises Node Interface 200 is programmed via the DSP 262 to generate a message for transmission to the network 16 via the PG 160 or a device, which is hereinafter referred to as terminal equipment (TE) (block 278), to receive messages from the network 16 via the PG 160 (block 280), to receive messages from terminal equipment connected to the PNI (block 282), as well as to establish a POTS connection (block 284). As stated previously, each PNI is provided with a codec 260 and an analog front-end circuit 268 to process digital messages, as well as analog messages.

Figure 18:
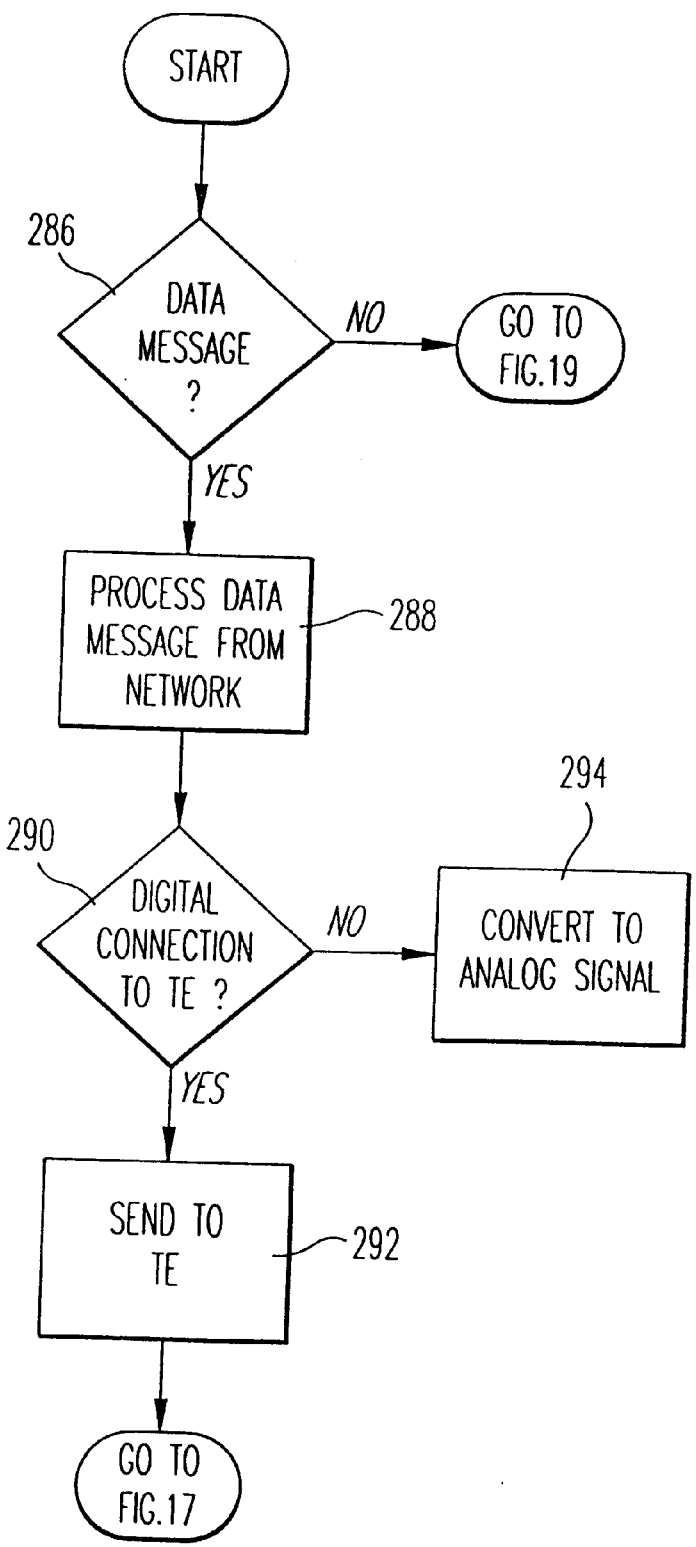

With reference to FIG. 18, when a message from the network 16 is received by the PNI 200, DSP 262 determines whether the message is a data message or a command message (blocks 286 and 288). If the message is a digital data message, the PNI 200 establishes a digital connection with the terminal equipment connected thereto and sends the message when the terminal equipment is configured to receive digital messages (blocks 290 and 292). If the terminal equipment can only accept analog messages, the PNI 200 is programmed to convert the digital data message into an analog signal via the analog front-end circuitry 268 (block 294). The analog message is subsequently forwarded to the terminal equipment once an analog connection is established.

Figure 19:
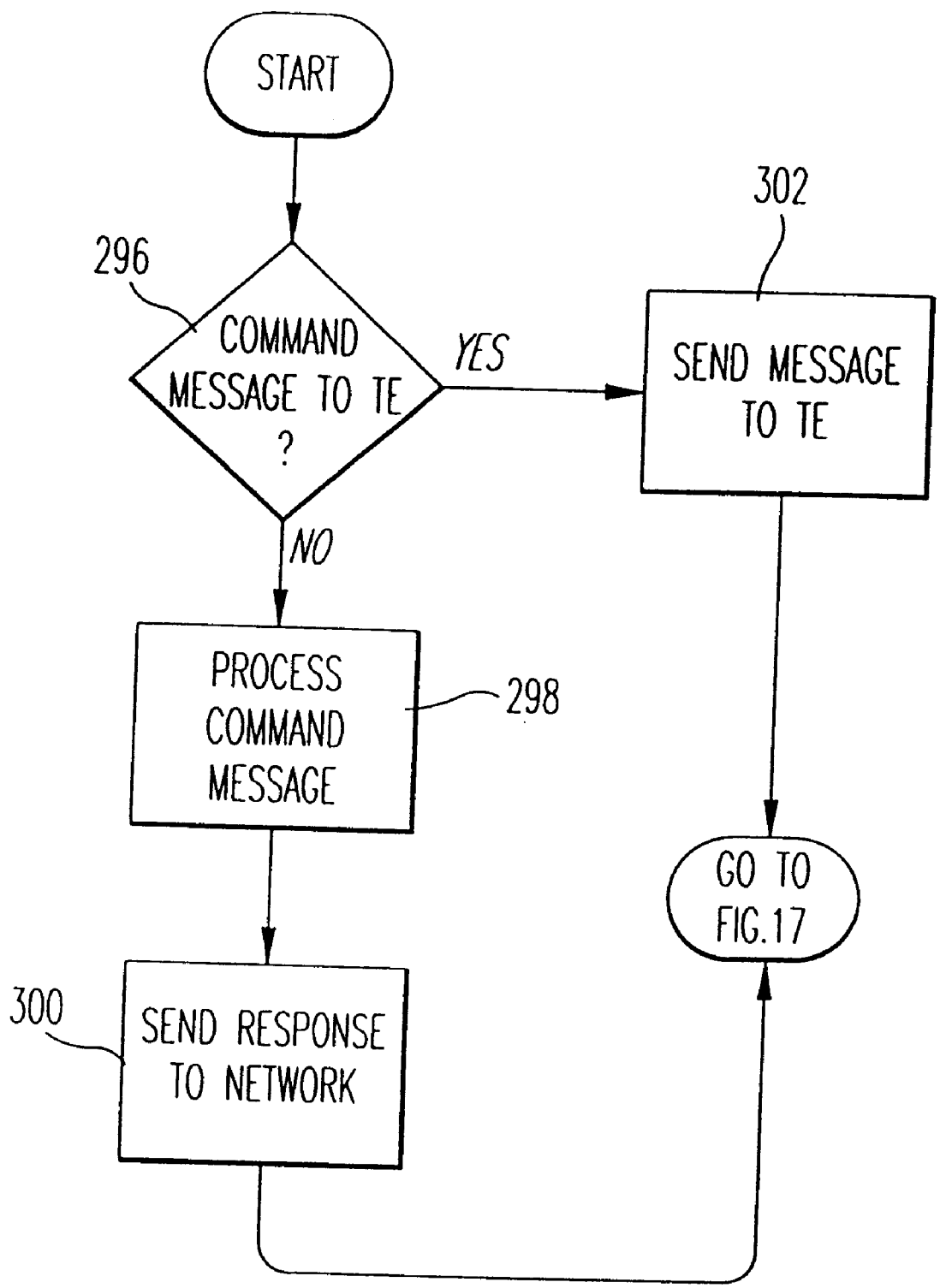

With reference to FIG. 19, if the data message from the network is a command message for the PNI 200, the PNI 200 processes the command message and then returns an appropriate response to the network 16 via the PG 160 (blocks 296, 298 and 300). If the command message is for the terminal equipment, as opposed to the PNI 200, the PNI sends the message to the terminal equipment (block 302). For example, the command message can be a utility meter reading request from a utility company 11*b*. The PG 160 can be programmed to communicate with the PNI 200*g* connected to the meter 216 that is to be read via digital communications or wireless communications. The PNI subsequently communicates with the utility meter via power line signaling, for example. The utility meter can provide the PNI with a meter reading. The PNI subsequently transmits the meter reading back to the PG 160 for transmission to the utility company 11*b* via the network 16.

Figure 20:
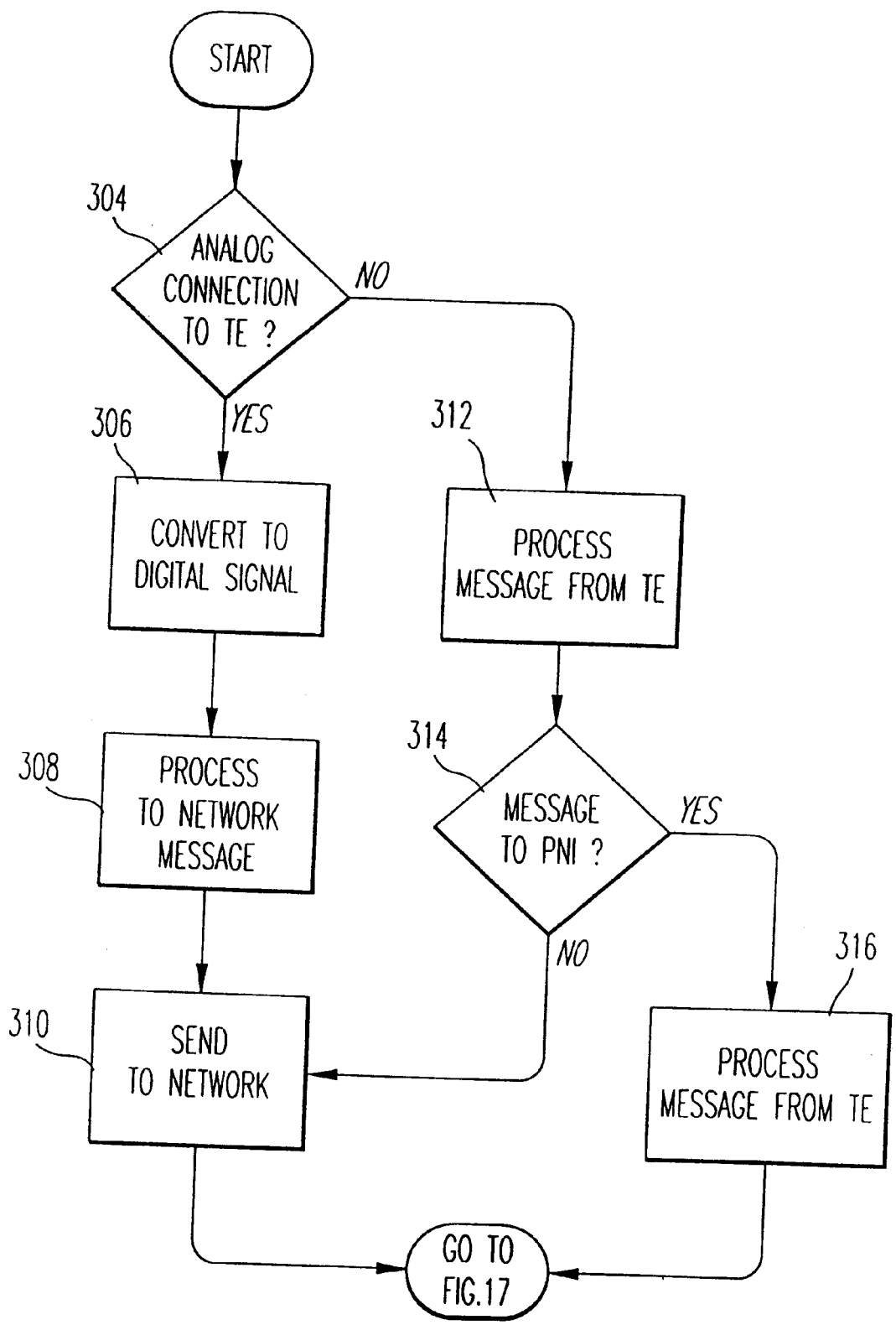
Figure 21:
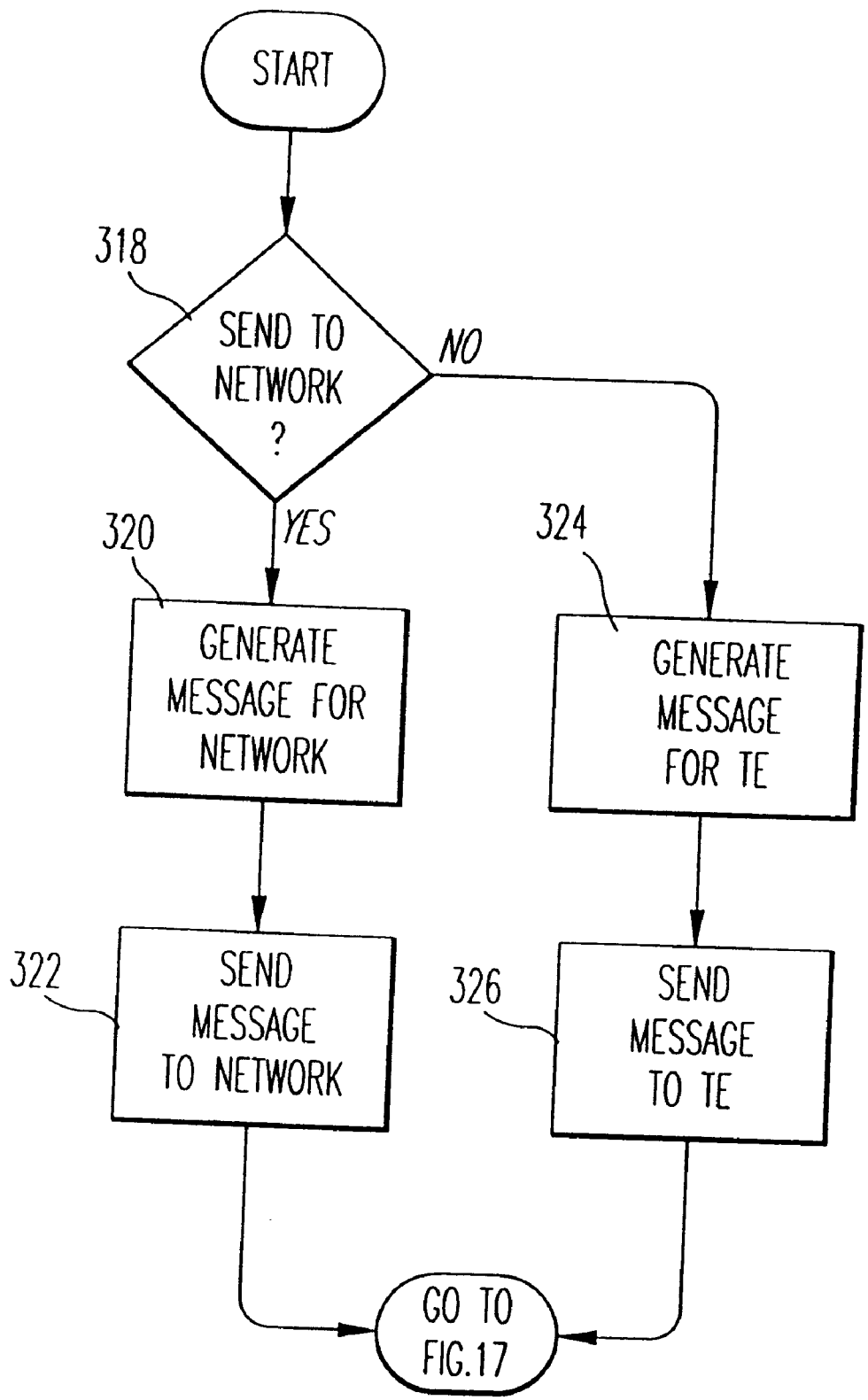

FIG. 20 illustrates signaling between the terminal equipment (e.g., the PC 208) and PNI (e.g., the PNI 200*c*) in further detail. If the PNI is connected to the terminal equipment via analog circuit means and transmission media (block 304), the DSP 262 is programmed to assume that no message is being sent from the terminal equipment to the PNI. The signaling from the terminal equipment is converted to digital signaling, that is, the analog signaling is packetized (block 306) and sent to the network or to another PNI via the PG 160 (blocks 308 and 310). If the terminal equipment is connected to the PNI via digital communication circuitry, the DSP is programmed to process the message from the terminal equipment to determine whether the message is for the PNI or for the network (blocks 312 and 314). If the message is for the PNI, the PNI can process the message (block 316); otherwise, the message is forwarded to the network via the PG 160. As shown in FIG. 21, the PNI 200 is programmed to send messages to either the network 16 (blocks 318, 320 and 322) or to the terminal equipment connected thereto (blocks 324 and 326).

Figure 22:
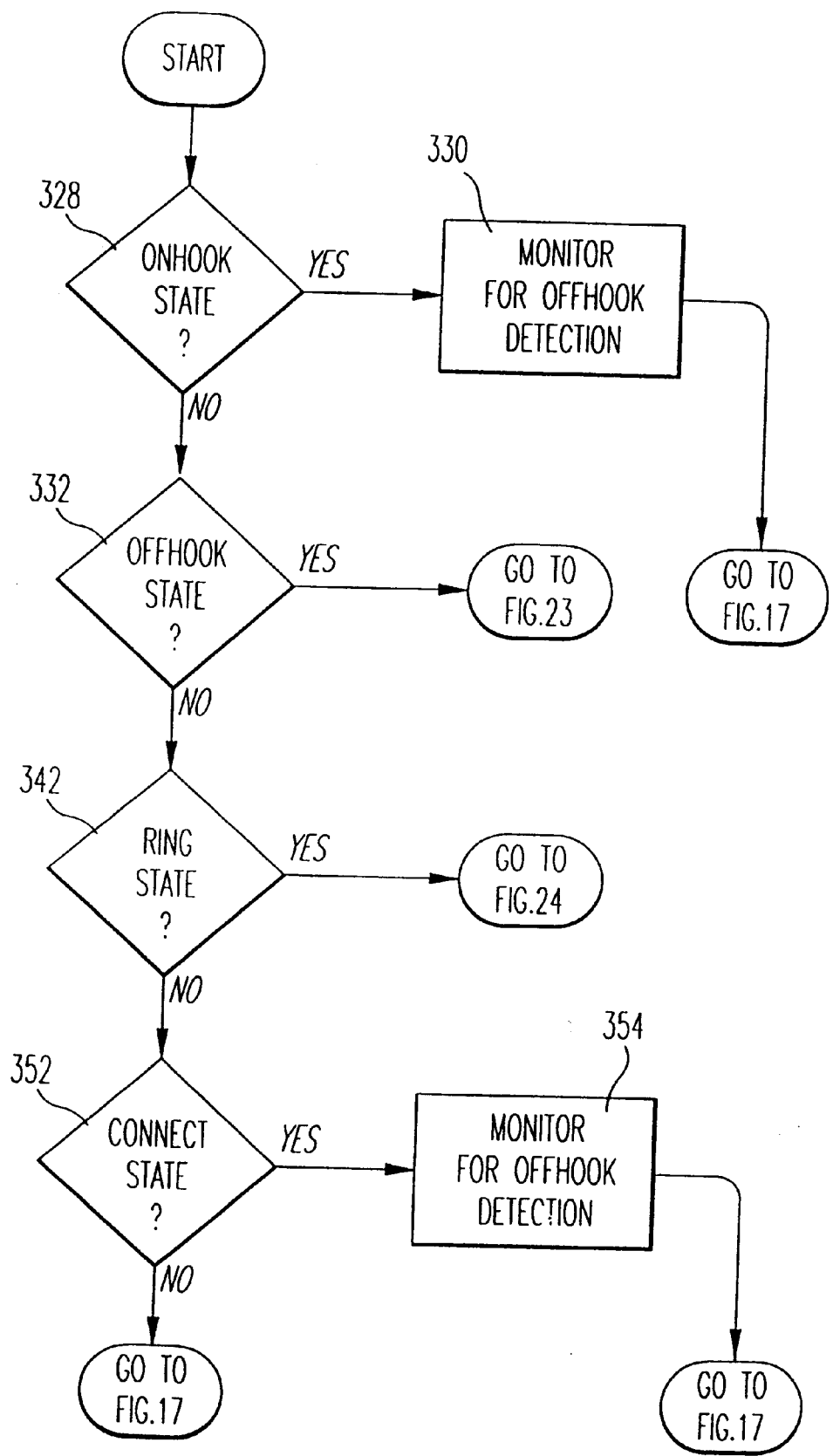

With reference to FIGS. 22–24, the PNI 200*a* is preferably programmed to control an individual node directly via a POTS line, as well as accommodate broadband communications. In other words, the PG 160 and the PNI 200*a* are configured to allow both narrow band communications and broadband communications. As stated previously, the PNI is programmed to determine if an incoming signal from the network 16 is a network message (e.g., a data message or a command message) or a POTS connection for one of the terminal equipment, as indicated in FIG. 17. If the incoming signal is for a POTS connection, the PG 160 suppresses the ring signal, as described above, via the switching device 221 on the twisted pair network interface card 176. The PG 160 subsequently determines which PNI or PNIs 200 to communicate with using CallerID information in the incoming signal from the network or distinctive ringing. Once communication with the particular node is established, the PG 160 communicates with the PNI connected to that node to indicate that an incoming call from the network has been received.

As shown in FIG. 22, the PNI monitors the line to the terminal equipment for its on-hook state (blocks 328 and 330). Once the terminal equipment (TE) goes off-hook, the PNI sends a dialtone to the TE (block 332 in FIG. 22 and block 334 in FIG. 23). The PNI then collects dialed digits from the terminal equipment and transmits them to the network 16 via messaging with the PG 160 (blocks 336 and 338) to establish a call connection (block 340). If the TE is not attempting to dial out, the PNI can send a ring signal to the TE (block 342 in FIG. 22 and block 344 in FIG. 24). If the TE goes off-hook, the PNI terminates the ring signal (blocks 346 and 348); otherwise a connection is established (block 350 in FIG. 24 and block 352 in FIG. 22). The PNI subsequently monitors the TE connection for an on-hook condition to terminate the connection (block 354).

In accordance with another aspect of the present invention, broadband signals can be sent from the PG 160 to a PNI 220*a* or 200*b* on the same transmission media as narrow band signals, that is, a twisted pair carrying a voice call. For example, six megabits of data can be transmitted from the demarcation point by the PG 160 to the subscriber's premises 162 simultaneously with a voice call on the same transmission path or medium. Thus, the PG 160 can send a analog signal to a selected node (i.e., a selected telephone wall jack) and a data signal to the same node or jack. Further, the PG 160 can route more than one data signal to the same node or jack simultaneously using the same twisted pair.

A number of signaling techniques can be used to attain multi-channel, peer-to-peer broadband communications over the twisted pair medium which allow dynamic assignment of bandwidth to each of a number of channels and which support standard POTS communications over the same medium. For example, time division multiplexing can be used whereby the communications channel provided by the twisted pair is divided into time slots. The data on the twisted pair constitutes a digital pulse stream which is encoded to provide a sufficient number of digital transitions to create a pulse wave, the frequency component of which is out-of-band with respect to POTS communications. The time slots on the communications channel can be assigned to address selected ones of a plurality of devices connected to one PNI or to allow more than one data source on the network to provide digital data to the same PNI on the same medium.

Another signaling technique for implementing multi-channel, peer-to-peer broadband communications over the twisted pair medium is frequency division multiplexing. Different frequencies can be defined to correspond to respective subchannels. For example, every PNI and therefore corresponding network node that employs the twisted pair medium can be assigned a frequency channel on which to modulate digital data transmitted to the network 16 and to demodulate digital data received from the network 16. The frequency channels are preferably spectrally isolated and outside the 0–4 kiloHertz band.

The frequency division multiplexing method, however, limits dynamic allocation of bandwidth. Thus, a combination of time division multiplexing in the frequency domain can preferably be employed to implement multi-channel, peer-to-peer broadband communications over the twisted pair medium. Accordingly, essentially every network node employing the twisted pair medium is assigned one or more time slots per a time division multiplexed (TDM) frame, depending on the nodes' bandwidth requirements. Thus, the carrier frequency can remain the same for all nodes. The PNIs are provided with circuitry to modulate and demodulate using the carrier frequency as well as to synchronize and process signals transmitted in a TDM frame.

Discrete-multi-tone (DMT) technology can also be used to implement multichannel, peer-to-peer broadband communications over the twisted pair medium. DMT is the standard in the ADSL specification promulgated by the American National Standards Institute (ANSI). DMT divides available communication channel bandwidth into subchannels approximately 0–4 kiloHertz wide. Each subchannel is then assigned a bit rate of transmission according to its signal-to-noise ratio (SNR). Quadrature amplitude modulation (QAM) is used to modulate the sub-channel. The information from various subchannels is processed using an inverse fast Fourier transform (IFFT) algorithm to create a composite signal that is transmitted from a network 16 source to a twisted pair. A PNI receiving the information performs a fast Fourier transform (FFT) algorithm to obtain the subchannel components of the composite signal and then performs QAM decoding to obtain the original information. DMT supports dynamic allocation of bandwidth and allows for POTS over the same medium.

DMT is adapted in accordance with the present invention to have peer-to-peer capability and to support multi-channel communications. For example, DMT subchannels are dynamically assigned to nodes or PNIs based on bandwidth requirements and SNR. No two nodes have the same DMT subchannels.

The system of the present invention uses on-hook signaling such that data being downloaded to a particular CPE 17 can be done without ringing the telephone 13, and without requiring a person to physically lift the handset on a telephone to notify the central office that the call has been answered. Further, on-hook signaling makes it possible to have ADSI phones or phones with similar communication protocols connected to existing analog telephone lines. As stated previously, the system 10 is advantageous because it suppresses the first ring signal and enables a host system to communicate with a data communications device 15, a meter 24, 38 or 40, or an appliance 19, without disturbing the subscriber. Further, the system 10 does not require modification of the switch at the central office when the system is installed at the demarcation point 20 or utility meter site on the subscriber's premises 12. The system 10 supports a premises gateway device infrastructure to address devices at a subscriber premises individually for Automated Meter Reading services and other remote system data communication services. The system 10 can communicate with utility companies and enhanced information service provider servers via a regular PSTN, with gas and water meters via short-range radio frequency communication and with electrical appliance using CE-Bus protocol.

As described in above, a no-ring access system 10 can be provided at a central office 18, as opposed to a subscriber's premises or at a demarcation point 20 (FIG. 1). The PG 160 has been described thus far at a demarcation point, as depicted in FIG. 9. In accordance with another embodiment of the invention, a PG 160 is provided at the central office 18 and is operable as an Internet Protocol (IP) gateway, as shown in FIG. 25.

Figure 25:
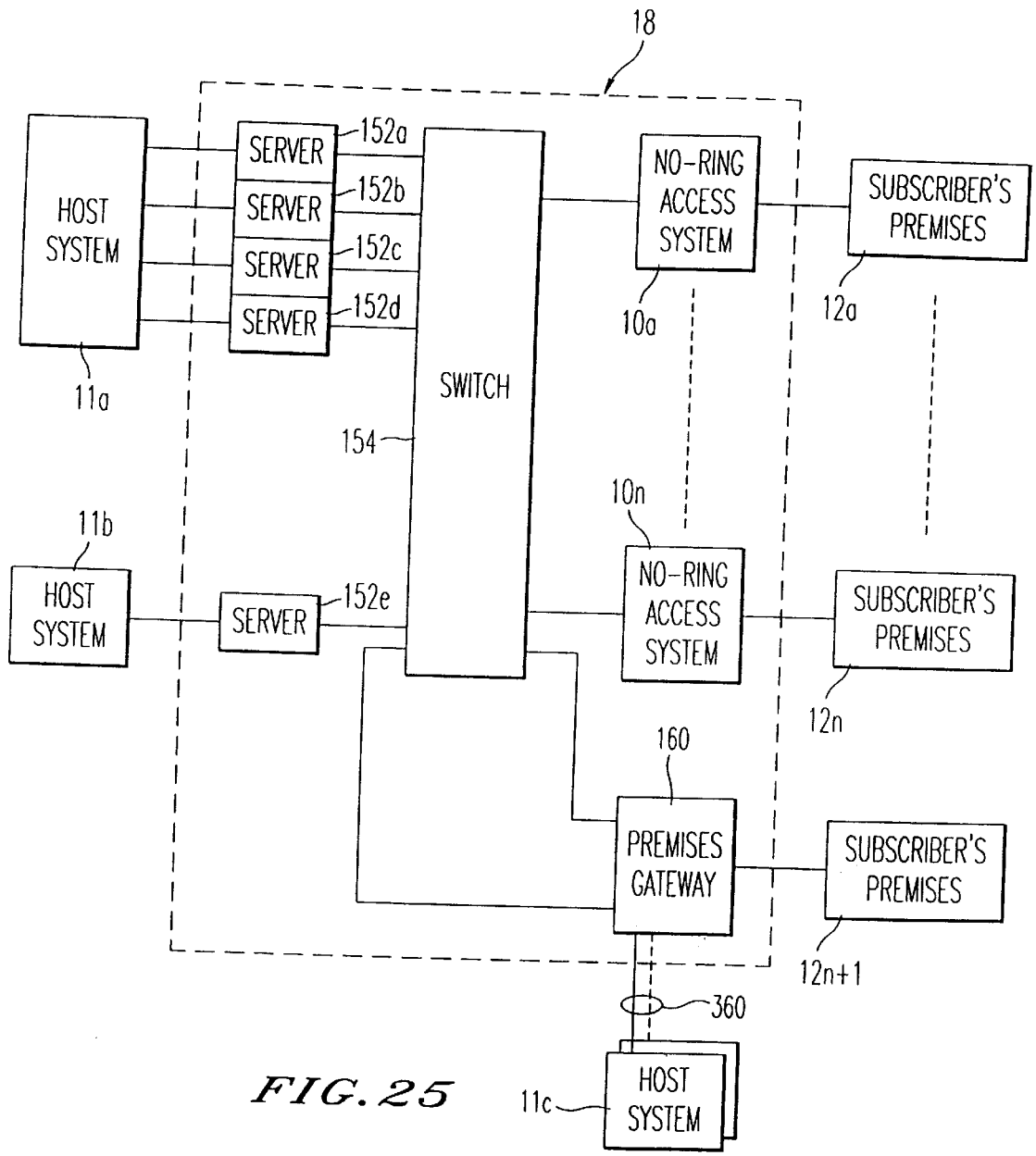
FIG. 25 is a schematic block diagram of an Internet protocol gateway constructed in accordance with an embodiment of the present invention.

With continued reference to FIG. 25, The PG 160 can be connected to equipment at a subscriber's premises $12_{n+1}$ via an analog telephone line, a fiber optic link, and a coaxial cable link, among other communication links. The PG 160 is also preferably connected to one or more data networks, as indicated at 360 in FIG. 25 and to a PSTN via a switch 154. The PG 160 is connected to the server side of the switch 154. Alternatively, the PG 160 can be connected to the line side of the switch 154, as indicated by the phantom line. The PG 160 is configured to analyze an incoming call, as described in connection with the CPU board 186 and FIGS. 11–24, to determine if the incoming call is a data call or a voice call using CallernID, distinctive ringing or special tones. If the PG 160 receives a voice call, the PG 160 directs the incoming call to the intended call recipient via the PSTN using the switch 154. If the incoming call is determined to be a data call, the PG 160 can bypass the PSTN and direct the data call to a particular data network for access to an Internet service provider, which is illustrated as host system 11 C is FIG. 25. Internet Protocol (IP) conversion can be implemented on the data network. Accordingly, an PG 160 at a central office 18 provides a user with an IP gateway.

While certain advantageous embodiments have been chosen to illustrate the invention, it will be understood by those skilled in the art that various changes and modifications can be made herein without departing from the scope of the invention as defined in the appended claims.

What is claimed is:

1. A system deployed at a subscriber premises for connecting network devices and host systems on a network to individually addressable nodes connected to subscriber premises devices at the subscriber premises, comprising:

a premises gateway comprising a central processing device, a bus, at least one of a plurality of network interface devices configured to establish a connection between at least one of said network devices and said host systems to a selected one of said subscriber premises devices via said premises gateway, each of said network interface devices being configured to receive inbound signals generated by said at least one of said network devices and said host systems and transmitted on a first communication link selected from the group consisting of a twisted pair wire link, a fiber optic link, a coaxial cable link a hybrid fiber optic/coaxial cable link, and a wireless communication link, to process said signals for transmission on said bus, and to receive outbound signals generated by said subscriber premises devices via said bus, and at least one of a plurality of subscriber premises interface devices configured to receive said outbound signals generated by said at least one of said subscriber premises devices and transmitted on a second communication link selected from the group consisting of a twisted pair wire link a fiber optic link, a coaxial cable like a hybrid fiber optic/coaxial cable link and a wireless communication link to process said signals for transmission on said bus, and to receive said inbound signals via said bus, said central processing device being operable to control routing of said inbound signals and said outbound signals on said bus by analyzing signals generated by said network interface devices and said subscriber premises interface devices and generating command signals; and at least one premises node interface connected to one of said subscriber premises devices and configured to receive said outbound signals therefrom and to transmit said outbound signals via said second communication link, and configured to receive said inbound signals via said second communication link, said premises node interface comprising a switching device to suppress the transmission of said inbound signals to said one of said subscriber premises devices, said switching device being opened and closed in response to said command signals from said central processing device.

2. A system as claimed in claim 1, wherein said central processing device is programmable to determine from data in said inbound signal whether said inbound signal is intended for said at least one subscriber premises device and to command said at least one premises node interface to operate said switching device to transmit said inbound signal to said one of said subscriber premises devices.

3. A system as claimed in claim 2, further comprising a plurality of premises network node interfaces connected to respective ones of a plurality of subscriber premises devices, said central processing device being programmable to route said inbound signals to selected ones of said plurality of subscriber premises devices by commanding said premises network nodes corresponding to said selected ones of said plurality of subscriber premises devices to operate said switching device to transmit said inbound signal thereto.

4. A system as claimed in claim 1, wherein said premises node interface is configured to process said inbound signals and said outbound signals for communication via a link selected from the group consisting of a twisted pair wire link, a fiber optic link, a coaxial cable link, a hybrid fiber optic/coaxial cable link, and a wireless communication link.

5. A system as claimed in claim 4, further comprising:

a plurality of premises node interfaces connected to a plurality of different subscriber premises devices, respective ones of said subscriber premises devices requiring receipt of said inbound signals and transmission of said outbound signals via different communication links selected from the group consisting of a twisted pair wire link, a fiber optic link, a coaxial cable link, a hybrid fiber optic/coaxial cable link, and a wireless communication link; and a plurality of said subscriber premises interface devices configured to transmit said inbound signals and to receive said outbound signals via different types of said second communication links selected from the group consisting of a twisted pair wire link, a fiber optic link, a coaxial cable link, a hybrid fiber optic/coaxial cable link, and a wireless communication link, said central processing device being programmable to determine from data in said inbound signal for which one of said plurality of subscriber premises devices said inbound signal is intended, and to route said inbound signal to a selected one of said subscriber interface devices via said bus in accordance with said type of communication link required by said subscriber premises device intended to receive said inbound signal.

6. A system as claimed in claim 1, wherein said first communication link and said second communication link are twisted pair wire links, said inbound signal comprises a narrow band analog signal and a broadband digital signal modulated thereon, and said central processing device is programmable to route both of said analog signal and said digital signal to said premises node interface.

7. A premises gateway as claimed in claim 1, further comprising a plurality of said at least one premises node interface and wherein at least one of said plurality of network interface devices comprises a second switching device and a processor, said processor being operable to close said second switching device when an incoming call from said network is received, said processor device being operable to notify said central processing device of said incoming call, said central processing device being operable to determine to which of said subscriber premises devices to direct said incoming call and to instruct at least one of said plurality of premises node interfaces to operate said switching device corresponding thereto to receive said incoming call.

8. A method for selectively routing signals between host systems and networks and subscriber premises devices, the host systems and networks and the subscriber premises devices employing different transmission media and protocols, the method comprising the steps of:

receiving an incoming call from one of said host systems and networks at a network interface device at said subscriber premises, said incoming call being transmitted on a first communication link selected from the group consisting of a twisted pair wire link, a fiber optic link, a coaxial cable link, a hybrid fiber optic/coaxial cable link, and a wireless communication link, said network interface device being operable to process said incoming call on said first communication link for transmission on a bus;

operating a first switching device on said network interface device to suppress said incoming call from being directed to said subscriber premises devices via said bus;

determining for which of said subscriber premises devices said incoming call is intended using a central processing device connected to said bus, said subscriber premises devices communicating with one of a plurality of subscriber premises interface devices via a second communication link selected from the group consisting of selected from the group consisting of a twisted pair wire link a fiber optic link, a coaxial cable link, a hybrid fiber optic/coaxial cable link, and a wireless communication link;

providing said incoming call on said bus to one of said plurality of subscriber premises interface devices that is in communication with said subscriber premises device for which said incoming call is intended; and commanding a premises node interface connected to said subscriber premises device to operate a second switching device to provide said incoming call from said bus thereto.

9. A method as claimed in claim 8, wherein said first communication link is different from said second communication link, said network interface device and the corresponding one of said plurality of subscriber premises interface devices being operable to convert said incoming call for communication between said bus and said first communication link and said second communication link, respectively.

10. A method as claimed in claim 8, wherein a plurality of network interfaces is connected between said bus and respective ones of two or more transmission paths selected from the group consisting of a twisted pair wire link, a fiber optic link a coaxial cable link, a hybrid fiber optic/coaxial cable link, and a wireless communication link, the method further comprising the steps of:

operating a second switching device on one of said subscriber premises devices to suppress an outgoing call from being directed to said plurality of network interface devices via said bus;

determining for which of said plurality of network interface devices said outgoing call is intended, said plurality of network interface devices being configured to process said outgoing call for transmission to one of said host systems and networks via one of said transmission paths;

providing said outgoing call on said bus; and commanding said network node interface devices for which said outgoing call is intended to operate the first switching device corresponding thereto to provide said outgoing call from said bus thereto.

\* \* \* \* \*